United States Patent
McAuliffe et al.

(10) Patent No.: US 7,113,112 B2
(45) Date of Patent: Sep. 26, 2006

(54) PPM-BASED DATA COMPRESSION

(75) Inventors: Jon McAuliffe, Berkeley, CA (US); David Joerg, New York, NY (US)

(73) Assignee: Vindigo, Inc., New York, NY (US)

( * ) Notice: Subject to any disclaimer, the term of this patent is extended or adjusted under 35 U.S.C. 154(b) by 360 days.

(21) Appl. No.: 10/123,758

(22) Filed: Apr. 16, 2002

(65) Prior Publication Data

US 2003/0012400 A1 Jan. 16, 2003

Related U.S. Application Data

(60) Provisional application No. 60/284,003, filed on Apr. 16, 2001.

(51) Int. Cl.
*H03M 7/34* (2006.01)

(52) U.S. Cl. .......................................... 341/51; 341/106
(58) Field of Classification Search .................. 341/51, 341/106
See application file for complete search history.

(56) References Cited

U.S. PATENT DOCUMENTS 6,526,401 B1 * 2/2003 Ito .................................. 707/3
6,535,642 B1 * 3/2003 De Bonet .................... 382/232

OTHER PUBLICATIONS

J. G. Cleary, et al. "Unbounded Length Context for PPM", Data Compression Conference, 1995. DCC '95. Proceedings, Mar. 28–30, 1995, pp. 52–61.*

Alistair Moffat, "Implementing the PPM data compression scheme", Communications, IEEE Transactions, vol. 38, Issue 11, Nov. 1990, pp. 1917–1921.*

J. G. Cleary, et al. "The entropy of English using PPM-based models", Data Compression Conference, 1996. DCC '96. Proceedings, Mar./Apr. 1996, pp. 53–62.*

Dmitry Shkarin, "PPM: one step to practicality", Data Compression Conference, 2002. Proceeding DCC 2002, 2002, pp. 202 211.*

* cited by examiner

*Primary Examiner*—Michael Tokar
*Assistant Examiner*—Khai Nguyen
(74) *Attorney, Agent, or Firm*—David Garred, Esq.

(57) ABSTRACT

Techniques are disclosed that reduce the computational complexity of PPM-based data compression through use of certain simplifying assumptions that permit faster search for a close-to-optimal PPM model than conventional techniques. The disclosed techniques permit the cost of the computationally-expensive model building task to be amortized over many compression/decompression cycles by maintaining a PersistentModel class, accessible to both the coder and decoder side of the system. This allows the computationally-expensive model building task to be performed only occasionally, as opposed to each time a message is coded. Furthermore, the model-building task is preferably scheduled to run at non-busy times, such that it minimizes user-perceptible service disruptions.

19 Claims, 70 Drawing Sheets

```
//  NAME: ModelOptimizer
//
// DESCRIPTION:
//
//    Find the (approximately) best prediction_by_partial_match (PPM) model
//    of a string. A model is comprised of a set of contexts and each
//    context's corresponding probabilities for the subsequent symbol.
//
//    Specifically, given a symbol sequence s = <s_1 s_2 ... s_n> of 8_bit
//    ASCII characters and a maximum context length k, we determine the
//    exclusion_blending order_k (aka PPM) model M* which approximately
//    minimizes
//
//                  f(M, s)  =  b(M) + e(M) * |s|
//
//    where b(M) is the number of bits required to represent M, e(M) is the
//    entropy of M (in bits/symbol), and |s| = n is the length of s. Note
//    e(M) * |s| is the entropy_theoretic lower bound on the coded size of s
//    using M, which bound we can in fact achieve via arithmetic coding but
//    never beat on average (Shannon's noiseless source channel theorem).
//    Also note that e(M) is just a weighted average of the entropies in
//    each context, with weights equal to the context occurrence
//    probabilities.
//
//    An exclusion_blending order_k model predicts the next symbol based on
//    the previous k symbols a = <a_1 a_2 ... a_k> by choosing the longest
//    context present in the model that is a suffix of a (hence "prediction
//    by partial match"). That is, if the matching order_k context c was
//    included in the chosen model, then that context's probabilities are
//    used, ignoring all lower_order sub_contexts of c (all of which also
//    suffix_match a); otherwise a matching order_(k_1) context is used,
//    etc. (There is always a match at order zero.) The "blending" of all
//    matching contexts' probabilities in a PPM model thus amounts to giving
//    weight 1 to the highest_order matching context and 0 to all others;
//    thus the name "exclusion_blending order_k model".
//
//    The exclusion technique entails that the addition of a context c to a
//    model M (giving a new model M') changes, for each symbol x predicted
//    by c, the symbol probability of x in the highest_order sub_context of
//    c that has non_zero prediction probability for x. This change in
//    probabilities in turn implies that the contribution of the
//    sub_contexts to the model entropy changes as well. Thus, regrettably,
//    e() fails in general to have the property
//
//                  e(M') = p_c * e(c) + (1 _ p_c) * e(M)
//
//    where p_c is the probability of the context occurring in s. It would
//    certainly simplify the optimization if this property held.
//
//    The number of distinct contexts used in M is unconstrained __ if
//    f(M', s) is less than f(M, s), then we choose M' over M, even if it
//    uses more contexts. The set of all distinct contexts up to order k
//    over a q_ary alphabet has size
//
```

FIG. 1A

```
//    (1.1)   1 + q + q^2 + ... + q^k = (q^(k+1) _ 1) / (q _ 1)
//
//    The set of all possible order_k PPM models is the *powerset* of this
//    set, so that the model space we mean to search is *super*_exponential
//    in q and k. Obviously, we are going to add some serious assumptions to
//    constrain the search. In particular:
//
//    (1) If a context is never encountered in s, it is not considered for
//        inclusion in the model. This is necessary (because there is no way
//        to estimate probabilities for such contexts), highly expedient
//        (because it rules out the vast majority of higher_order contexts),
//        and harmless __ by assumption, we are only using our model on the
//        same string s against which it is fit, so ignoring contexts which
//        never occur in s can never increase model entropy.
//
//    (2) Consider the two models M*_(i_1) and M*_i which minimize f(M, s)
//        over all models having (i_1) and i contexts, respectively. We can
//        write the difference d(i) = [ f(M*_(i_1), s) _ f(M*_i, s) ] as
//
//            |s|[ e(M*_(i_1)) _ e(M*_i) ] _ [ b(M*_i) _ b(M*_(i_1)) ]
//
//                       = d_code(i) _ d_state(i)
//
//        which illustrates the trade_off between the relative sizes of the
//        two models, d_state(i), and the relative lengths of their codings
//        of s, d_code(i). If d(i) is positive, then it is better to use the
//        best i_context model than to use the best (i_1)_context model.
//        Generally we would expect d_code(i) to decrease monotonically in
//        i, approaching zero as e(M*_i) nears the best possible order_k PPM
//        entropy, while d_state(i) should increase monotonically in i. If
//        this were true, it would imply that d(i) can cross zero at most
//        once. Practically speaking, d(i) will cross zero exactly once, so
//        that for some unique i*
//
//                       d(i) > 0 when i <= i*,
//                       d(i) < 0 when i >  i*
//
//        If d(i) had this property, then we could minimize f(M, s) exactly
//        by sequentially determining the best model with
//        1, 2, 3, ..., i, ..., contexts, then stopping when we discovered
//        i*. (Recall that i is bounded above by equation 1.1.) In fact we
//        will just assume d(i) behaves this way and conduct such a search,
//        stopping the first time d(i) < 0.
//
//        Note that this is still an exponential amount of work, since we
//        study an exponential number of candidate contexts each time we
//        determine M*_i. However, if |s| is relatively small, we're likely
//        to find d(i) < 0 for a small value of i, which is at least an
//        improvement over the unconstrained search.
//
```

FIG. 1B

```
//   (3) We make the rather strong assumption that the set of i contexts
//       which comprise M*_i (cf. 2) contains as a subset the set of (i_1)
//       contexts which comprise M*_(i_1). This imposes a simple
//       hierarchical structure on the models examined for each i as we
//       let i grow from 1, which makes the optimization vastly more
//       manageable (though still exponential in k).
//
package com.vindigo.build.PPM;

import java.io.*;
import java.text.*;
import java.util.*;

import com.vindigo.build.BatchApp;
import com.vindigo.db.sys.Channel;

// Find the (approximately) best PPM model with maximum order k for a given
// string s.
public class ModelOptimizer
{
   // The symbol sequence s = <s_1 s_2 ... s_n> to model.
   private char[] _symSequence;

// The maximum context length k to consider.
   private int _maxOrder;

// The best model with (i_1) contexts, M*_(i_1), and the objective
   // function value on it.
   private Model  _bestModel;
   private double _bestValue;

// Always add the best unused context, even if it degrades the
optimization.
   // For testing.
   private boolean _testing;

// How much diagnostic output to generate.
   private boolean _verbose;

// For output formatting.
   private DecimalFormat _df = new DecimalFormat("0.000000");

private double _objectiveValue(Model model, boolean hypothesized)
   {
      Model.Costs costs =
         (hypothesized ? model._hypothesizedCosts : model._trueCosts);

// XXX The objective function should really be an instance variable
      // XXX of the optimizer.
      double value =
         costs._stateSize + costs._entropy * model._totalSymbolsSeen;

return value;
   }
```

FIG. 1C

```
public ModelOptimizer(String symSequence, int maxOrder, boolean verbose)
{
  _symSequence = symSequence.toCharArray();
  _maxOrder    = maxOrder;
  _verbose     = verbose;
}

// Minimize (approximately) the value of the objective function over
// all PPM models.
public Model findBestModel(boolean persistent)
{
  ModelNode unusedContext     = null;
  ModelNode bestUnusedContext = null;
  double    hypothesizedValue;
  double    bestHypothesizedValue;

// Create the null model, containing no predictive contexts at all.
  // Trying to use it for prediction as is would throw an error.
  if (persistent)
    _bestModel = new PersistentModel(_maxOrder);
  else
    _bestModel = new Model(_maxOrder);

// Fit all the trace counts from s.
  _bestModel.updateFromSequence(_symSequence, _maxOrder + 1);

if (_verbose)
    System.out.print("Trace counts:\n" + (TraceCounts) _bestModel);

// We force the null context into every model, so that we always have
  // at least one candidate context in which to predict a symbol.
  _bestModel._addNullContext();
  _bestValue = _objectiveValue(_bestModel, false);

if (_verbose)
  {
    System.out.println("Added null context: e(M*_0) = " +
                       _df.format(_bestModel._trueCosts._entropy) +
                       ", b(M*_0) = " +
                       _bestModel._trueCosts._stateSize + ", f(M*_0, s) = "

_df.format(_bestValue));
  }

ModelWalker modelWalker = new ModelWalker(_bestModel, _maxOrder);
  modelWalker.restrictToUnaddedContexts();
```

FIG. 1D

```
while (true)
{
  modelWalker.reset();

if (! modelWalker.hasNext())
  {
    // There are no unused contexts left to examine. We're done.
    System.out.println("All contexts were added to the model.");
    break;
  } bestHypothesizedValue = Double.NaN;

while (modelWalker.hasNext())
  {
    unusedContext = (ModelNode) modelWalker.next();
    _bestModel._addContext(unusedContext, true);
    hypothesizedValue = _objectiveValue(_bestModel, true);

if (_verbose)
    {
      System.out.println(
        "Tried context " + unusedContext + ": e(M_i) = " +
        _df.format(_bestModel._hypothesizedCosts._entropy) +
        ", b(M_i) = " +
        _bestModel._hypothesizedCosts._stateSize +
        ", f(M_i, s) = " + (long) Math.ceil(hypothesizedValue)
      );
    } if (Double.isNaN(bestHypothesizedValue) ||
        hypothesizedValue < bestHypothesizedValue)
    {
      bestHypothesizedValue = hypothesizedValue;
      bestUnusedContext     = unusedContext;
    }
  } if (bestHypothesizedValue >= _bestValue && ! _testing)
  {
    // Adding the best available context would be worse than doing
    // nothing, so we're done.
    break;
  }
}
```

FIG. 1E

```
    // Adding the best unused context leads to an improvement in the
    // objective function, so put that context into the model.
    _bestModel._addContext(bestUnusedContext, false);
    _bestValue = bestHypothesizedValue;

if (_verbose)
    {
      System.out.println("Added best context " + bestUnusedContext +
                    ": e(M*_i) = " +
                    _df.format(_bestModel._trueCosts._entropy) +
                    ", b(M*_i) = " + _bestModel._trueCosts._stateSize ", f(M*_i, s) = " + (long) Math.ceil(_bestValue));
    }
  }

_bestModel._finalize();

System.out.println("BEST MODEL: # active contexts = " +
                  _bestModel._numActiveContexts +
                  ", mean syms/context = " +
                  _df.format(_bestModel._meanSymsPerContext) +
                  ", e(M*) = " +
                  _df.format(_bestModel._trueCosts._entropy) +
                  " bits/symbol, b(M*) = " +
                  _bestModel._trueCosts._stateSize +
                  " bits, f(M*, s) = " + (long) Math.ceil(_bestValue) +
                  " bits");
  System.out.println("BEST COMPRESSED SIZE: "
                  + (long) Math.ceil(_bestValue / 8) + " bytes");

return _bestModel;
} public static void main(String[] args)
throws java.io.IOException
{
  ModelOptimizer   optimizer;
  Model            bestModel;
  int              maxOrder = 0, channelID = _1;
  String           inFileName = "", symbolSequence = "", line, code = "";
  File             inFile;
  LineNumberReader reader;
  boolean          verbose = false, testing = false, persistent = false;
  LinkedList       channelCodeList = null;
  BatchApp         app = null;
```

FIG. 1F

```
for (int i = 0; i < args.length; i++)
{
  if (args[i].equals("__in_file"))
  { if (++i < args.length)
      inFileName = args[i];
    else
      usage();
  }
  else if (args[i].equals("__max_order"))
  {
    if (++i < args.length)
      maxOrder = Integer.parseInt(args[i]);
    else
      usage();
  }
  else if (args[i].equals("__verbose"))
  {
    verbose = true;
  }
  else if (args[i].equals("__test"))
  {
    testing = true;
  }
  else if (args[i].equals("__persistent"))
  {
    persistent = true;

if (++i < args.length)
      channelID = Integer.parseInt(args[i]);
    else
      usage();

if (++i < args.length)
      code = args[i];
    else
      usage();

app = new BatchApp();

channelCodeList = new LinkedList();
    channelCodeList.add(new Channel(app, channelID));
    channelCodeList.add(code);
  }
  else
  {
    usage();
  }
}
```

FIG. 1G

```
      if (testing)
      {
         optimizer = new ModelOptimizer("cacbcaabca", 2, true);
         optimizer._testing = true;
         bestModel = optimizer.findBestModel(persistent);
         if (persistent)
         {
            ((PersistentModel) bestModel).setApp(app);
            ((PersistentModel) bestModel).streamToDB(channelCodeList);
         }
         System.exit(0);
      } inFile = new File(inFileName);
      if (!inFile.exists() || !inFile.canRead())
      {
         System.err.println("ERROR: Cannot access data file '" + inFileName +
                         "'");
         throw new IOException("Cannot access data file '" + inFileName + "'");
      } if (maxOrder == 0)
         usage();

reader = new LineNumberReader(new FileReader(inFile));
      while ((line = reader.readLine()) != null)
         symbolSequence += line + TraceCountNode.NUL;
      reader.close();

optimizer = new ModelOptimizer(symbolSequence, maxOrder, verbose);
      bestModel = optimizer.findBestModel(persistent);

if (persistent)
      {
         ((PersistentModel) bestModel).setApp(app);
         ((PersistentModel) bestModel).streamToDB(channelCodeList);
      }

System.exit(0);
   } public static void usage()
   {
      System.err.println("Usage: ModelOptimizer __in_file <file> " +
                      "__max_order <pos. int> [__verbose] [__test] " +
                      "[__persistent <channel_id> <code>]");
      System.exit(1);
   }
}
```

FIG. 1H

```
// NAME: Model
//
// DESCRIPTION:
//
//    State and behavior for a prediction_by_partial_match model of a target
//    symbol sequence, using some particular set of contexts with maximum
//    order k. The context data are represented as a forward tree of
//    ModelNodes.
// package com.vindigo.build.PPM;

import java.util.*;

public class Model
      extends TraceCounts
{
  protected static class Costs
        implements Cloneable
  {
    // The entropy of the model.
    protected double _entropy;

// The state in bits required to represent the model.
    protected int _stateSize;

protected Object clone()
    {
      Object obj;
      try
      {
        obj = super.clone();
      }
      catch (CloneNotSupportedException cnse)
      {
        throw new Error("Clone not supported.");
      }
      return obj;
    } protected void copyFrom(Costs otherCosts)
    {
      _entropy   = otherCosts._entropy;
      _stateSize = otherCosts._stateSize;
    }
  }
```

FIG. 2A

```
// The maximum order of the model.
protected int _maxOrder;
public    int getMaxOrder()
{
  return _maxOrder;
}

// Whether the model has any active contexts.
protected boolean _isEmpty;

// The entropy and state size of the current model and the current
// model with possibly one additional hypothesized context.
protected Costs _trueCosts          = new Costs();
protected Costs _hypothesizedCosts  = new Costs();

// The number of active contexts in the model.
protected int _numActiveContexts;

// The unweighted average of (_numPredictedChildren + 1) over all active
// contexts (we add 1 to account for the escape symbol).
protected double _meanSymsPerContext;

// During compression and decompression, we keep track of the context
// from which we should begin the search for the next (de)coding context,
// using the just_(de)coded argument symbol to nextCodingContext(). This
// context is stored in _prevMatchingContext. It will always be the
// longest matching context for the trace which preceded the
// aforementioned argument symbol, but _prevMatchingContext will *not* be
// the (de)coding context for that symbol unless it happens to be an
// active context. If it is not active, then one of its subcontexts was
// actually used to (de)code symbol.
private ModelNode _prevMatchingContext = null;

protected Model(int maxOrder)
{
  _root      = new ModelNode();
  _isEmpty   = true;
  _maxOrder  = maxOrder;
}
```

FIG. 2B

```
// Add one to the trace count for the trace at this node as well as all
// of its subtraces. Make sure to increment the context count and
// symbol_in_context count for whichever context predicts the symbol at
// the end of this trace (if any), and update the context entropy
// accordingly.
protected void _increment(ModelNode node)
{
  ModelNode child, prevNode, contextSwinger;

super._increment(node);

// This method should never be called on the root of a model's forward
  // tree, but just leave if it is (otherwise the code below will cause
  // the null symbol to be predicted by the null context).
  if (node == _root)
  {
    System.err.println("Model._increment(): WARNING: Called on root " +
                        "node.");
    return;
  }

// Don't bother updating context_related variables if the model
  // contains no active contexts.
  if (_isEmpty)
    return;

// Follow the sub_trace vines until every node has been inspected
  // up to and including the root.
  for (prevNode = null, contextSwinger = (ModelNode) node._parent;
       prevNode != contextSwinger;
       prevNode = contextSwinger,
       contextSwinger = (ModelNode) contextSwinger._subTraceVine)
  {
    // See whether this context (as opposed to one of its sub_contexts)
    // is the one used to predict the symbol labelling the node on which
    // this method was invoked. If the null context has not been added to
    // this model, then it's possible the symbol is not predicted by
    // any context, in which case asking the containing model to provide
    // a predictive context for it will throw an error.
    if (contextSwinger._contextVars._contextIsUsedInModel)
    {
      // XXX Need to subtract this context's contributions to _trueCosts
      // XXX before the call to _changeContextChildCount, then add back
      // XXX the updated contributions after the call (a la
      // XXX _adjustSubContextsForContext).
      // XXX DON'T USE THIS METHOD UNTIL THIS IS FIXED.
      contextSwinger._changeContextChildCount(node._symbol, 1);
      break;
    }
  }
}
```

FIG. 2C

```
protected void _addNullContext()
{
  _addContext((ModelNode) _root, false);
} protected void _addContext(ModelNode node, boolean hypothesized)
{
  Costs costs;

if (hypothesized)
  {
    _hypothesizedCosts.copyFrom(_trueCosts);
    costs = _hypothesizedCosts;
  }
  else
  {
    costs = _trueCosts;
  }

// Start off assuming that no supercontexts exist which would override
  // the use of this context to predict its children.
  node._initContextUse(hypothesized);

// Adjust the context state based on overriding supercontexts.
  node._adjustContextTalliesForSuperContexts(hypothesized);
  if (node._contextVars._contextCount == 0)
  {
    // This context is completely subsumed by supercontexts, so adding it
    // the model would have no effect on entropy or state size.
    if (hypothesized)
    {
      node._abandonHypothesisContext();
    }
    else
    {
      // It's not used and can never be, since its subsuming
      // supercontexts are permanently in the model. Treat it as though
      // it were added but deactivated, so we don't waste time trying to
      // add it again.
      // _contextWasAddedToModel was set to true in _initContextUse().
      node._contextVars._contextIsUsedInModel = false;
    }
    return;
  }
```

FIG. 2D

```
// For each symbol s predicted by node, adjust the longest subcontext
// included in the model which also predicts s for the addition of this
// context (reducing its contribution to the total model entropy and
// state size as well).
_adjustSubContextsForContext(node, hypothesized);

// Add to the total model size the fixed state size for every ancestor
// context whose fixed size has not yet been counted.
_adjustParentContextsForContext(node, hypothesized, true);

// Adjust the model entropy and size for the addition of this context.
costs._entropy +=
    ((double) node._contextVars._contextCount / _totalSymbolsSeen) *
    node._contextVars._contextEntropy;

costs._stateSize += node._contextVars._contextStateSize;

if (hypothesized)
{
    // Undo the changes that were needed to hypothesize.
    node._abandonHypothesisContext();
}
else
{
    // At the very least, the model contains the context we just finished
    // adding.
    _isEmpty = false;
}
} private void _adjustSubContextsForContext(ModelNode node,
    boolean hypothesized)
{
ModelNode child, prevNode, contextSwinger;
Iterator  childNodes;
Character  childSymObj;

// The root node has no subcontexts.
if (node == _root)
    return;

Costs costs = (hypothesized ? _hypothesizedCosts : _trueCosts);
```

FIG. 2E

```
// For each child symbol predicted by this context node, find the
// longest subcontext present in the model which also predicts that
// child symbol, and reduce its predictions of the symbol by the number
// of times this node predicts it.
childNodes = node._children.values().iterator();
while (childNodes.hasNext())
{
  child = (ModelNode) childNodes.next();

if (child._contextVars._symbolInContextCount == 0)
  {
    // When we decremented this node's prediction counts due to
    // supercontexts present in the model, this symbol was completely
    // subsumed by supercontexts, so there's no need to adjust
    // subcontexts.
    continue;
  } childSymObj = new Character(child._symbol);

// Swing through the subcontexts until every one has been inspected up
  // to and including the root.
  for (prevNode = null, contextSwinger = (ModelNode) node._subTraceVine;
       prevNode != contextSwinger;
       prevNode = contextSwinger,
       contextSwinger = (ModelNode) contextSwinger._subTraceVine)
  {
    // We don't have to worry here that contextSwinger's used_in_model
    // flag was temporarily set to false because of the current
    // hypothesis context __ that could only happen when
    // contextSwinger._adjustSelfForSuperContext() is called in this
    // loop, which doesn't happen until several lines below.
    if (! contextSwinger._contextVars._contextIsUsedInModel)
      continue;

// If the subcontext doesn't predict the child, we just move on.
    if (! contextSwinger._children.containsKey(childSymObj))
      continue;

costs._entropy _=
      ((double) contextSwinger._contextVars._contextCount /
       _totalSymbolsSeen) *
      contextSwinger._contextVars._contextEntropy;

costs._stateSize _= contextSwinger._contextVars._contextStateSize;

contextSwinger._adjustSelfForSuperContextChild(node, child,
       hypothesized);
```

FIG. 2F

```
      // The addition of this context to the model might have forced the
      // subcontext at contextSwinger out of the model (because every
      // symbol occurrence it used to predict will now be predicted by
      // this context). If so, don't add its costs back into the model
      // (they are undefined, since contextSwinger now no longer
      // participates in symbol prediction).
      if (contextSwinger._contextVars._contextIsUsedInModel)
      {
        costs._entropy +=
          ((double) contextSwinger._contextVars._contextCount /
            _totalSymbolsSeen) *
          contextSwinger._contextVars._contextEntropy;

costs._stateSize += contextSwinger._contextVars._contextStateSize;
      }
      else
      {
        // This subcontext just left the model. We have to decrement the
        // active context descendant count for each of its ancestors,
        // possible deducting their fixed sizes as well.
        _adjustParentContextsForContext(contextSwinger, hypothesized,
                                        false);

if (contextSwinger._contextVars._numActiveContextDescendants == 0)
        {
          // It has no active context descendants, so we don't have to
          // account for its fixed state size anymore.
          contextSwinger._contextVars._contextStateSize = 0;
        }
        else
        {
          // It has active context descendants, so we have to account for
          // its fixed state size.
          costs._stateSize +=
            contextSwinger._contextVars._contextStateSize;
        }
      } break;
    }
  }
}
```

FIG. 2G

```
// Adjust the total model size for the fixed state size of every ancestor
// context whose fixed size changes because this context is being
// added or dropped.
private void _adjustParentContextsForContext(ModelNode node,
    boolean    hypothesized,
    boolean    adding)
{
  ModelNode prevNode, ancestor;

// The root node has no parent context.
  if (node == _root)
    return;

Costs costs = (hypothesized ? _hypothesizedCosts : _trueCosts);

// Follow the parent pointers until every ancestor node has been
  // inspected up to and including the root.
  for (prevNode = null, ancestor = (ModelNode) node._parent;
       prevNode != ancestor;
       prevNode = ancestor,
       ancestor = (ModelNode) ancestor._parent)
  {
    costs._stateSize +=
      ancestor._adjustActiveContextDescendantCount(hypothesized, adding);
  }
}

// Count the number of active contexts and compute the average number
// of predicted symbols per context.
protected void _finalize()
{
  ModelNode context;

ModelWalker modelWalker = new ModelWalker(this, _maxOrder);
  modelWalker.restrictToActiveContexts();

while (modelWalker.hasNext())
  {
    context = (ModelNode) modelWalker.next();
    _numActiveContexts++;

// Add 1 to account for the escape symbol.
    _meanSymsPerContext +=
      context._contextVars._numPredictedChildren + 1;
  }

_meanSymsPerContext /= _numActiveContexts;
}
```

FIG. 2H

```
public int getNeededContextCount()
{
   int        contextCount = 0;
   ModelWalker modelWalker  = new ModelWalker(this, _maxOrder);

modelWalker.restrictToNeededContexts();
   while (modelWalker.hasNext())
   {
     modelWalker.next();
     contextCount++;
   } return contextCount;
}

// Returns null if the ModelNode corresponding to the argument is not
// present and active in the model.
public ModelNode initCodingContext(String str)
{
   char[] contextTrace = str.toCharArray();
   char   symbol;

_prevMatchingContext = (ModelNode) _root;

for (int i = 0; i < contextTrace.length; i++)
   {
     symbol = contextTrace[i];

_prevMatchingContext =
        (ModelNode) _prevMatchingContext._children.get(new
Character(symbol));

if (_prevMatchingContext == null)
        return null;
   } if (! _prevMatchingContext._contextVars._contextIsUsedInModel)
     _prevMatchingContext = null;

return _prevMatchingContext;
}

// Update _prevMatchingContext based on having just (de)coded the
// argument.
public ModelNode nextCodingContext(char symbol)
{
   ModelNode codingContext = null;
   ModelNode child         = null;

if (_prevMatchingContext == null)
     return null;
```

FIG. 2I

```
// Get to the largest context matching (_prevMatchingContext + symbol),
// whether active or not.
while (true)
{
  if (_prevMatchingContext._children != null)
  {
    child = (ModelNode)
            _prevMatchingContext._children.get(new Character(symbol));
  } if (child != null)
  {
    _prevMatchingContext = child;
    break;
  } if (_prevMatchingContext == _prevMatchingContext._subTraceVine)
  {
    // We're at the root of the forward tree.
    break;
  }

_prevMatchingContext = (ModelNode) _prevMatchingContext._subTraceVine;
}

// Switch to an active subcontext if necessary.
if (_prevMatchingContext._contextVars._contextIsUsedInModel)
  codingContext = _prevMatchingContext;
else
  codingContext = _prevMatchingContext.getNextActiveSubContext();

return codingContext;
  }
}
```

FIG. 2J

```
//
// NAME: ModelNode
//
// DESCRIPTION:
//
//   A node in a forward tree which contains
//
//    _ The occurrence counts of each context (a symbol sequence used to
//      condition the probability function for the next symbol).
//    _ The symbol occurrence counts within a particular context (which
//      are used to estimate the conditional probabilities).
//    _ The entropy within each context, _ \sum_s p(s|c) lg p(s|c), for
//      each symbol s that appeared after the context at least once.
// package com.vindigo.build.PPM;

import java.util.*;

public class ModelNode
       extends TraceCountNode
{
  protected static final double MINUS_LOG_2_E = _1.0D / Math.log(2.0D);

protected static class ContextVars
         implements Cloneable
  {
    // How many times this context is used by its enclosing model. (The count
    // is always with respect to the target symbol sequence used to fit the
    // model.) The sum of the symbolInContextCount values for all children of
    // a ModelNode is always equal to the contextCount of that node.
    protected int _contextCount;

// How many distinct symbols are predicted with non_zero probability
    // by this context.
    protected int _numPredictedChildren;

// Let <a_1 ... a_k> be the trace ending here (with symbol a_k). Then
    // this variable holds the number of times that the symbol a_k is coded
    // by the current model using context <a_1 ... a_(k_1)>. (The count is
    // always with respect to the target symbol sequence used to fit the
    // model.)
    protected int _symbolInContextCount;

// The within_context entropy.
    protected double _contextEntropy;
```

FIG. 3A

```
// A partial sum used in calculating within_context entropy. This is
//
//                   \sum_s (#s in c) * ln(#s in c)
//
// where c is this context, s ranges over the symbol alphabet, and
// (#s in c) is the number of times context c is used to predict s.
private double _partialEntropySum;

// The estimated number of bits needed to represent the decoder state
// (e.g. a Huffman tree to which a hash table entry points) for this
// context.
protected int _contextStateSize;

// Whether this context is used at all by its enclosing model.
protected boolean _contextIsUsedInModel;

// The number of descendant contexts (child, grandchild, ...) of this
// context which are actively used in the model. If this value is
// greater than zero, then this context must have its fixed state
// appear in the model, so that each active descendant context is
// reachable from the root.
protected int _numActiveContextDescendants;

protected Object clone()
{
  Object obj;
  try
  {
    obj = super.clone();
  }
  catch (CloneNotSupportedException cnse)
  {
    throw new Error("Clone not supported.");
  }
  return obj;
} protected void copyFrom(ContextVars otherContextVars)
{
  _contextCount            = otherContextVars._contextCount;
  _numPredictedChildren    = otherContextVars._numPredictedChildren;
  _symbolInContextCount    = otherContextVars._symbolInContextCount;
  _contextEntropy          = otherContextVars._contextEntropy;
  _partialEntropySum       = otherContextVars._partialEntropySum;
  _contextStateSize        = otherContextVars._contextStateSize;
  _contextIsUsedInModel    = otherContextVars._contextIsUsedInModel;
  _numActiveContextDescendants =
    otherContextVars._numActiveContextDescendants;
}
}
```

FIG. 3B

```
// Whether the true context state for this node has been saved
// in _preHypothesisContextVars (presumably because of a pending
// hypothetical addition of a context).
protected boolean _didSaveContextVars;

// Reverse pointers for every sub_trace vine pointer that points to this
// node.
private LinkedList _superTraceVines;

protected ContextVars _contextVars              = new ContextVars();
private   ContextVars _preHypothesisContextVars = new ContextVars();

// Whether we are currently hypothesizing about adding this context.
private boolean _isHypothesizedContext;

// It's possible that a context will have
// _contextVars._contextIsUsedInModel set to false even though the
// context was added to the model (because subsequently_added
// supercontexts completely subsume the context). This variable remembers
// that a context was added even if it dies out in this manner.
protected boolean _contextWasAddedToModel;

// Constructor for all non_root nodes.
protected ModelNode(char symbol, ModelNode parent, ModelNode subTraceVine)
{
  super(symbol, parent, subTraceVine);
  _contextVars._contextEntropy = Double.NaN;
}

// Constructor for the root node.
protected ModelNode()
{
  super();
  _contextVars._contextEntropy = Double.NaN;
} protected void _addSuperTraceVine(ModelNode superTraceNode)
{
  if (_superTraceVines == null)
  {
    _superTraceVines = new LinkedList();
  }
  _superTraceVines.add(superTraceNode);
}
```

FIG. 3C

```
protected TraceCountNode _createChild(char            symbol,
                                      TraceCountNode parent,
                                      TraceCountNode subTraceVine)
{
  ModelNode child = new ModelNode(symbol, (ModelNode) parent,
                                  (ModelNode) subTraceVine);
  ((ModelNode) subTraceVine)._addSuperTraceVine(child);
  return child;
} protected void _revertContextVars()
{
  ModelNode child;
  Iterator  childNodes = _children.values().iterator();

_contextVars.copyFrom(_preHypothesisContextVars);
  _didSaveContextVars = false;

while (childNodes.hasNext())
  {
    child = (ModelNode) childNodes.next();
    if (child._didSaveContextVars)
    {
      child._contextVars.copyFrom(child._preHypothesisContextVars);
      child._didSaveContextVars = false;
    }
  }
} protected void _changeContextChildCount(char childSymbol, int delta)
{
  ModelNode child = (ModelNode) _getOrAddChild(childSymbol);
  _changeContextChildCount(child, delta, false);
}
```

FIG. 3D

```
protected void _changeContextChildCount(ModelNode child, int delta,
                                        boolean hypothesized)
{
  int newContextCount, newChildInContextCount;

if (! _contextVars._contextIsUsedInModel)
  {
    if (! hypothesized)
    {
      // This context is not used in the model, and we're not currently
      // hypothesizing an additional context, so this method was invoked
      // in error.
      throw new Error("_changeContextChildCount(" + child._symbol + ", " +
                      delta + ") called on node " + this +
                      " not in model and not being hypothesized");
    }

// This context is not in the model, but we are hypothesizing adding
    // either it or one of its supercontexts. If the latter, we don't need
    // to do any work here. Either way, we don't have to save pre_
    // hypothesis state, since it's not used in the model anyway.
    if (! _isHypothesizedContext)
      return;
  }
  else
  {
    // This context is in the model.
    if (hypothesized)
    {
      // This change is just being hypothesized. Since we forbid
      // hypothesizing the addition of a context already present in the
      // model, we know that the hypothesis is about some supercontext of
      // this context (whose addition would force changes in the use of
      // this context for prediction, by the exclusion principle). Save
      // all necessary pre_hypothesis values, unless we already did so.
      if (! _didSaveContextVars)
      {
        _preHypothesisContextVars.copyFrom(_contextVars);
        _didSaveContextVars = true;
      }
      if (! child._didSaveContextVars)
      {
        child._preHypothesisContextVars.copyFrom(child._contextVars);
        child._didSaveContextVars = true;
      }
    }

// The change we are making is meant to be permanent, not
    // hypothetical. No need to worry about saving pre_hypothesis state.
  }
```

FIG. 3E

```
    if (delta == 0)
      return;

newChildInContextCount = child._contextVars._symbolInContextCount +
delta;
    if (newChildInContextCount < 0)
    {
      // The given delta caused the child to have a negative within_context
      // frequency. This should never happen and is unrecoverable.
      throw new Error("delta '" + delta + "' caused negative frequency for "
+
                    "symbol '" + child._symbol + "' in context " + this);
    }
    else if (newChildInContextCount == 0)
    {
      // This child is now never predicted in this context.
      _contextVars._numPredictedChildren__;
    }
    else if (child._contextVars._symbolInContextCount == 0)
    {
      // This child went from zero to a positive number of predictions
      // in this context.
      _contextVars._numPredictedChildren++;
    } newContextCount = _contextVars._contextCount + delta;

_computeContextEntropyFromChange(child, newChildInContextCount,
                                    newContextCount);

_computeContextStateSizeFromChange(child, newChildInContextCount,
                                       newContextCount);

child._contextVars._symbolInContextCount = newChildInContextCount;
    _contextVars._contextCount               = newContextCount;
  }

//
  // Compute from scratch and store the within_context entropy. Assumes
  // that the _symbolInContextCount of each child is correct, and that this
  // node's _contextCount is the sum over all children of that value.
  //
  // Note that within this function we simulate one additional child to
  // represent the escape symbol. Its _symbolInContextCount is defined
  // to be 1 always, and _contextCount is treated as one larger than its
  // actual value to reflect this.
  //
  // The entropy within this context c, given every symbol s in the
  // alphabet, is defined as
  //
  //                e(c) = _ \sum_s [ p(s|c) * lg p(s|c) ]
  //
```

FIG. 3F

```
// The unbiased estimate of entropy within this context is therefore
//
//           _ \sum_s [ (#s in c) / #c * lg [ (#s in c) / #c ] ]
//
// Do a little algebra to convince yourself that this in turn equals
//
//       _lg(e) * [ (\sum_s [ (#s in c) * ln(#s in c) ] / #c) _ ln(#c) ]
//
// (where lg(.) is log base_2 and ln(.) is log base_e). This requires
// fewer operations to compute. Using instance variable names, this is
// written
//
// MINUS_LOG_2_E *
//    [ _partialEntropySum / _contextCount _ ln(_contextCount) ]
//
protected void _computeContextEntropy()
{
  ModelNode child;

if (_children == null || _children.size() == 0 ||
      _contextVars._contextCount == 0)
  {
    throw new Error("Model node " + this + " cannot be a context");
  }

_contextVars._partialEntropySum = 0.0D;

Iterator childNodes = _children.values().iterator();

while (childNodes.hasNext())
  {
    child = (ModelNode) childNodes.next();
    _contextVars._partialEntropySum +=
      child._contextVars._symbolInContextCount *
      Math.log(child._contextVars._symbolInContextCount);
  }

// We don't have to add the escape symbol's term into _partialEntropySum
  // explicitly, because its fixed frequency of 1 implies that its
  // corresponding term is always zero. The only effect on this computation
  // is that we add 1 to _contextCount below.

_contextVars._contextEntropy =
    MINUS_LOG_2_E *
    (_contextVars._partialEntropySum / (_contextVars._contextCount + 1) _
    Math.log(_contextVars._contextCount + 1));
}
```

FIG. 3G

```
// Compute and store the new within_context entropy that results from
// setting the given child node's symbol_within_context count to the
// given value (leading to the new total context count for this node,
// which is also provided).
protected void _computeContextEntropyFromChange(ModelNode child,
    int newChildInContextCount,
    int newContextCount)
{
  if (newContextCount == 0)
  {
    // This context just de facto exited the model.
    _contextVars._contextIsUsedInModel = false;
    _contextVars._partialEntropySum    = 0.0D;
    _contextVars._contextEntropy       = Double.NaN;
    return;
  } double newPartialEntropyTerm =
    ((newChildInContextCount > 0)                                       ?
     (newChildInContextCount * Math.log(newChildInContextCount))        :
     0.0D                                                               );

double oldPartialEntropyTerm =
    ((child._contextVars._symbolInContextCount > 0)        ?
     (child._contextVars._symbolInContextCount *
      Math.log(child._contextVars._symbolInContextCount))  :
     0.0D                                                  );

_contextVars._partialEntropySum +=
    (newPartialEntropyTerm _ oldPartialEntropyTerm);

// Account for the implicit presence of the escape symbol (whose
  // frequency is fixed at 1 by definition) by adding one to the
  // total context count for this context.

_contextVars._contextEntropy =
    MINUS_LOG_2_E *
    (_contextVars._partialEntropySum / (newContextCount + 1) _
    Math.log(newContextCount + 1));
} protected int _adjustActiveContextDescendantCount(boolean hypothesized,
    boolean adding)
{
  int prevCount = _contextVars._numActiveContextDescendants;

if (hypothesized && ! _didSaveContextVars)
  {
    _preHypothesisContextVars.copyFrom(_contextVars);
    _didSaveContextVars = true;
  }
```

FIG. 3H

```
    _contextVars._numActiveContextDescendants += (adding ? 1 : _1);

if (prevCount == 0)
 {
   if (! adding)
   {
     throw new Error("number of active context descendants must be " +
                     "non_negative");
   } if (! _contextVars._contextIsUsedInModel)
   {
     // See _computeContextStateSize().
     _contextVars._contextStateSize = 24;

// Every node except the root incurs the cost required to hold its
     // symbol and pointer in its parent. See _computeContextStateSize().
     if (_parent != this)
       _contextVars._contextStateSize += 32;

return _contextVars._contextStateSize;
   }
   else
   {
     return 0;
   }
 }
 else if (_contextVars._numActiveContextDescendants == 0 &&
          ! _contextVars._contextIsUsedInModel)
 {
   int oldSize = _contextVars._contextStateSize;
   _contextVars._contextStateSize = 0;

return _oldSize;
 }
 else
 {
   return 0;
 }
}
```

FIG. 3I

```
protected void _computeContextStateSize()
{
  // The representation of this context in the decoder requires:
  //
  // STATE IN PARENT CONTEXT
  // Child symbol:        8 bits    (the symbol at this context's node)
  // Child pointer:       16 bits   (pointer to this context)
  // Align to 2_byte word: 8 bits
  //
  // STATE IN THIS CONTEXT
  // Child context count: 8 bits
  // Vine pointer:        15 bits
  // Active flag:         1 bit
  // Huffman tree:        16 bits * (# predicted symbols _ 1)
  //
  // The 8_bit alignment cost is somewhat pessimistic. A context will
  // need the alignment if it has an even number of "needed" children
  // (children which are either active contexts or ancestors of active
  // contexts). The majority of contexts have no needed children, hence
  // require the alignment (zero is even), but not all contexts require
  // it.
  //
  // If the context predicts n symbols with non_zero probability
  // (counting the escape symbol), it needs a Huffman tree on n
  // symbols. Because a Huffman tree is always a complete binary tree
  // (every node has either zero or two children), this implies there are
  // (n_1) internal nodes and n leaf nodes. By storing a leaf child
  // directly in the branch node, rather than pointing to a separate leaf
  // node, we can represent the tree using just (n_1) 16_bit node pairs.
  // Each node pair contains two 8_bit nodes. Each node has a 1_bit flag
  // to indicate whether it is a branch or leaf node and a 7_bit symbol.
  // Since the ISO_8859_1 alphabet is 8_bit, this necessitates building a
  // reduction mapping to the most commonly occurring 127 symbols
  // (leaving one space for the escape symbol) and escaping the remaining
  // symbols which appear in the sequence. This is not accounted for or
  // handled by the optimizer.
  //
  // Since the n' we use below (_numPredictedChildren) doesn't account
  // for the escape symbol, i.e. n' = (n_1), we have 16n' bits as the
  // state required for the Huffman tree.

// Since this method only gets called when a context is initially
  // hypothesized in (or added to) a model, we know we have not yet
  // counted its fixed size as long as it has no active descendants.
  if (_contextVars._numActiveContextDescendants == 0)
  {
    _contextVars._contextStateSize = 24;

// Every node except the root incurs the cost required to hold its
    // symbol and pointer in its parent.
    if (_parent != this)
      _contextVars._contextStateSize += 32;
  }
}
```

FIG. 3J

```
      _contextVars._contextStateSize += 16 *
_contextVars._numPredictedChildren;
  } protected void _computeContextStateSizeFromChange(ModelNode child,
      int newChildInContextCount,
      int newContextCount)
  {
    // If newContextCount == 0, then this context just left the model,
    // so we might need to do some accounting on its fixed size and
    // its ancestors' fixed sizes. That happens in
    // _adjustSubContextsForContext().

if (newChildInContextCount == 0)
    {
      // This context no longer predicts this child.
      _contextVars._contextStateSize -= 16;
    }
    else if (child._contextVars._symbolInContextCount == 0)
    {
      // This context just started predicting this child.
      _contextVars._contextStateSize += 16;
    }
  } protected void _initContextUse(boolean hypothesized)
  {
    ModelNode child;
    Iterator  childNodes;

if (_children == null || _children.size() == 0)
    {
      throw new Error("Model node " + this + " has no children, so it " +
                      "cannot be a context");
    } childNodes = _children.values().iterator();

if (_contextVars._contextIsUsedInModel || _contextWasAddedToModel)
    {
      throw new Error("Tried to add context " + this +
                      " (hypothesized = '" + hypothesized + "') already " +
                      "used in model");
    }

_isHypothesizedContext      = hypothesized;
    _contextWasAddedToModel     = ! hypothesized;
```

FIG. 3K

```
// We're here initializing this context either to add it or to
// hypothesize adding it, so it's definitely not in the model. We need
// to save its _contextVars if we're hypothesizing, though, because we
// might have counted its fixed state size already (if it's an ancestor
// of some context already in the model).
if (hypothesized)
  _preHypothesisContextVars.copyFrom(_contextVars);

_contextVars._contextIsUsedInModel  = ! hypothesized;
_contextVars._contextCount          = 0;
_contextVars._numPredictedChildren  = 0;

while (childNodes.hasNext())
{
   child = (ModelNode) childNodes.next();

// Should never be true, since _traceCount should be non_zero for
   // every node in the tree (otherwise the node wouldn't have been
   // created in the first place).
   if (child._traceCount == 0)
     throw new Error("Trace " + child + " has zero trace count");

child._contextVars._symbolInContextCount = child._traceCount;
   _contextVars._contextCount += child._contextVars._symbolInContextCount;
   _contextVars._numPredictedChildren++;
}

_computeContextEntropy();
_computeContextStateSize();
} protected void _abandonHypothesisContext()
{
  ModelNode prevNode, prevNode2, contextSwinger, ancestor, child;
  Iterator  childNodes;

if (! _isHypothesizedContext)
     throw new Error("Node " + this + " is not a hypothesized context.");
```

FIG. 3L

```
// Swing through the subcontexts and unadjust each of them up to and
// including the root.
for (prevNode = null, contextSwinger = (ModelNode) _subTraceVine;
     prevNode != contextSwinger;
     prevNode = contextSwinger,
     contextSwinger = (ModelNode) contextSwinger._subTraceVine)
{
  if (contextSwinger._didSaveContextVars)
  {
    if (! contextSwinger._contextVars._contextIsUsedInModel)
    {
      // The subcontext was forced out of the model by the hypothesized
      // context, so its ancestors' _contextVars might have changed.
      // Put them all back as necessary.
      for (prevNode2 = null, ancestor = (ModelNode)
contextSwinger._parent;
           prevNode2 != ancestor;
           prevNode2 = ancestor,
           ancestor = (ModelNode) ancestor._parent)
      {
        if (ancestor._didSaveContextVars)
          ancestor._revertContextVars();
      }
    }
    contextSwinger._revertContextVars();
  }
}

// Follow the parent pointers until every ancestor node has been
// inspected up to and including the root.
for (prevNode = null, ancestor = (ModelNode) _parent;
     prevNode != ancestor;
     prevNode = ancestor,
     ancestor = (ModelNode) ancestor._parent)
{
  if (ancestor._didSaveContextVars)
    ancestor._revertContextVars();
}

_isHypothesizedContext = false;
_contextVars.copyFrom(_preHypothesisContextVars);

childNodes = _children.values().iterator();
while (childNodes.hasNext())
{
  child = (ModelNode) childNodes.next();
  child._contextVars._symbolInContextCount = 0;
}
}
```

FIG. 3M

```
protected void _adjustSelfForSuperContextChild(ModelNode superContext,
    ModelNode superContextChild,
    boolean   hypothesized)
{
  ModelNode child;
  int       superContextChildCount;

if (!((superContext._contextVars._contextIsUsedInModel ||
         superContext._isHypothesizedContext              )
        &&
        (_contextVars._contextIsUsedInModel || _isHypothesizedContext)))
  {
    // Either the supercontext is not a part of the model, or this
    // context is not a part of the model. Either way, there's no work to
    // do here.
    return;
  }

// Here we know both this context and the supercontext are a part of
  // the model (one of them may only be hypothesized currently).

// Decrement based on the given child of the given supercontext.
  child =
    (ModelNode) _children.get(new Character(superContextChild._symbol));

if (child == null)
  {
    throw new Error("Tried to adjust count at this context " + this +
                    " for child '" + superContextChild._symbol +
                    "' of supercontext " + superContext + ", but no " +
                    "such child exists here.");
  } superContextChildCount =
    superContextChild._contextVars._symbolInContextCount;

if (superContextChildCount > child._contextVars._symbolInContextCount)
  {
    throw new Error("For child '" + superContextChild._symbol + "', " +
                    " supercontext " + superContext + " count '" +
                    superContextChildCount + "' is greater than context " +
                    this + " count '" +
                    child._contextVars._symbolInContextCount +
                    "' ==> contradiction");
  }
  _changeContextChildCount(child, _superContextChildCount, hypothesized);
}
```

FIG. 3N

```
private void _decrementFromSuperContexts(LinkedList superContexts,
    boolean hypothesized)
{
  ModelNode    superContext, superContextChild;
  ListIterator superContextIter;
  Iterator     superContextChildNodes;

superContextIter = superContexts.listIterator();
  while (superContextIter.hasNext())
  {
    superContext = (ModelNode) superContextIter.next();

// This may be a leaf node and hence not really a supercontext.
    if (superContext._children == null ||
        superContext._children.size() == 0)
      return;

if (superContext._superTraceVines != null)
    {
      // Recursively decrement based on next_larger supercontexts.
      _decrementFromSuperContexts(superContext._superTraceVines,
                                  hypothesized);
    }

// Decrement child prediction counts based on this supercontext.

superContextChildNodes = superContext._children.values().iterator();
    while (superContextChildNodes.hasNext())
    {
      superContextChild = (ModelNode) superContextChildNodes.next();

// If this context doesn't predict the symbol, there's no need
      // to adjust for any supercontext that predicts it.
      if (! _children.containsKey(new
Character(superContextChild._symbol)))
        continue;

_adjustSelfForSuperContextChild(superContext,
                                      superContextChild, hypothesized);
    }
  }
} protected void _adjustContextTalliesForSuperContexts(boolean hypothesized)
{
  if (_superTraceVines != null)
    _decrementFromSuperContexts(_superTraceVines, hypothesized);
}
```

FIG. 30

```
public boolean isUsedInModel()
{
  return _contextVars._contextIsUsedInModel;
} public int getContextUseCount()
{
  return _contextVars._contextCount;
} public int getSymbolInContextCount()
{
  return _contextVars._symbolInContextCount;
} public int getChildCount()
{
  return ((_children == null) ? 0 : _children.size());
}

// Count the children which are themselves active contexts or ancestors
// of active contexts.
public int getNeededChildCount()
{
  int       contextChildCount = 0;
  Iterator  childNodes        = _children.values().iterator();

ModelNode child;
  while (childNodes.hasNext())
  {
    child = (ModelNode) childNodes.next();
    if (child._contextVars._contextIsUsedInModel ||
        child._contextVars._numActiveContextDescendants > 0)
      contextChildCount++;
  } return contextChildCount;
}
```

FIG. 3P

```
// Return all children which are themselves active contexts or ancestors
// of active contexts.
public List getNeededChildren()
{
  LinkedList contextChildren = new LinkedList();
  Iterator   childNodes      = _children.values().iterator();

ModelNode child;
  while (childNodes.hasNext())
  {
    child = (ModelNode) childNodes.next();

if (child._contextVars._contextIsUsedInModel ||
        child._contextVars._numActiveContextDescendants > 0)
      contextChildren.add(child);
  } return contextChildren;
} public int getPredictedChildCount()
{
  return _contextVars._numPredictedChildren;
} public List getPredictedChildren()
{
  LinkedList predictedChildren = new LinkedList();
  Iterator   childNodes        = _children.values().iterator();

ModelNode child;
  while (childNodes.hasNext())
  {
    child = (ModelNode) childNodes.next();
    if (child._contextVars._symbolInContextCount > 0)
      predictedChildren.add(child);
  } return predictedChildren;
}
```

FIG. 3Q

```
public ModelNode getNextActiveSubContext()
{
  ModelNode prevNode, contextSwinger;

// Swing through the subcontexts until every one has been inspected up
  // to and including the root.
  for (prevNode = null, contextSwinger = (ModelNode) _subTraceVine;
       prevNode != contextSwinger;
       prevNode = contextSwinger,
       contextSwinger = (ModelNode) contextSwinger._subTraceVine)
  {
    if (contextSwinger._contextVars._contextIsUsedInModel)
      return contextSwinger;
  } return null;
} public ModelNode getNextSubContextInModel()
{

// similar to getNextActiveSubContext() but this one includes
  // inactive contexts that have descendents.

ModelNode prevNode, contextSwinger;

// Swing through the subcontexts until every one has been inspected up
  // to and including the root.
  for (prevNode = null, contextSwinger = (ModelNode) _subTraceVine;
       prevNode != contextSwinger;
       prevNode = contextSwinger,
       contextSwinger = (ModelNode) contextSwinger._subTraceVine)
  {
    if ((contextSwinger._contextVars._contextIsUsedInModel) ||
        (contextSwinger._contextVars._numActiveContextDescendants > 0))
      return contextSwinger;
  } return null;
}
```

FIG. 3R

```
public int getLeafCount(Map reducedAlphabet)

// Get the number of children that will actually make it into the
// tree. This is only different from the predicted child count when
// there are more than 127 characters in the reduced alphabet.
// Note than the 127 does not include the ESC character which must be
// present, therfore the test at the beginning of this function is
// LESS THAN and _not_ LESS THAN OR EQUAL.

{
   Character  reducedSymbolObj;
   Iterator   predictedChildrenIter;
   ModelNode  predictedChild;
   int        result = 0;

if (reducedAlphabet.size () < 127)
   {
      return this.getPredictedChildCount();
   }

// Do the same analysis that happens when the HuffTable is prepared predictedChildrenIter = this.getPredictedChildren().iterator();
   while (predictedChildrenIter.hasNext())
   {
      predictedChild = (ModelNode) predictedChildrenIter.next();

reducedSymbolObj = (Character)
                        reducedAlphabet.get(new
Character(predictedChild.getSymbol()));

// If a symbol is in the reduced alphabet, it is emitted.

if (reducedSymbolObj != null)
         result++;

}
   return result;
}

```
//
// NAME: ModelWalker
//
// DESCRIPTION: Iterate over every context in a Model object, possibly
//              filtering the contexts returned to a particular subset.
//
// package com.vindigo.build.PPM;

public class ModelWalker
      extends TraceCountWalker
{
  // The maximum order of contexts in the model being walked.
  private int _maxOrder;

private boolean _restrictToUnaddedContexts;
  private boolean _restrictToActiveContexts;
  private boolean _restrictToNeededContexts;

protected boolean _isValid(TraceCountNode node)
  {
    if (((ModelNode) node)._children == null ||
        ((ModelNode) node)._children.size() == 0 ||
        node._traceLength > _maxOrder ||
        (_restrictToUnaddedContexts &&
         ((ModelNode) node)._contextWasAddedToModel) ||
        (_restrictToActiveContexts &&
         ! ((ModelNode) node)._contextVars._contextIsUsedInModel) ||
        (_restrictToNeededContexts &&
         ! ((ModelNode) node)._contextVars._contextIsUsedInModel &&
         ((ModelNode) node)._contextVars._numActiveContextDescendants == 0))
    {
      return false;
    }
    return true;
  } protected boolean _nodeShortCircuitsWalk(TraceCountNode node)
  {
    // We walk the forward tree from shortest trace to longest, so
    // as soon as some context is too long to be valid for the model,
    // we know all remaining unwalked contexts are also invalid.
    return (node._traceLength > _maxOrder);
  } public ModelWalker(Model model, int maxOrder)
  {
    super(model);
    _maxOrder = maxOrder;
  }
```

FIG. 4A

```
// Calling this forces a reset of the walker.
public void restrictToUnaddedContexts()
{
  _restrictToUnaddedContexts = true;
  reset();
}

// Calling this forces a reset of the walker.
public void restrictToActiveContexts()
{

_restrictToActiveContexts = true;
  reset();
}

// Calling this forces a reset of the walker.
public void restrictToNeededContexts()
{
  _restrictToNeededContexts = true;
  reset();
}

// Calling this forces a reset of the walker.
public void removeContextRestrictions()
{
  _restrictToUnaddedContexts = false;
  _restrictToActiveContexts  = false;
  _restrictToNeededContexts  = false;
  reset();
}
}
```

FIG. 4B

```
//
// NAME: PersistentModel
//
// DESCRIPTION:
//
//    Extension of the Model class for streaming to and from the Vindigo
//    database via SQL2Java classes.
// package com.vindigo.build.PPM;

import java.sql.*;
import java.text.*;
import java.util.*;

import com.bitmechanic.sql2java.*;

import com.vindigo.build.BatchApp;
import com.vindigo.build.BatchException;
import com.vindigo.db.ppm.*;
import com.vindigo.db.sys.*;

import org.log4j.Category;

public class PersistentModel
        extends Model
{
  private BatchApp _app;
  private PPMModel _ppmm;

private static final Category log =
    Category.getInstance( PersistentModel.class.getName());

private final StringBuffer _fitTimestampStr = new StringBuffer();

private void _getMostRecentModel(Channel channel, String code)
  throws BatchException
  {
    // Find the timestamp of the most recently fit model for this
    // <channel, code> pair.
    String select =
      "SELECT MAX(ppmm.whenFit) " +
      "FROM     " +
      PPMModel.getTableName() + " ppmm, " +
      PPMModel2ChannelCode.getTableName() + " ppmm2cc " +
      "WHERE ppmm2cc.model    = ppmm.ID " +
      "  AND ppmm2cc.channel = " + channel.getID() +
      "  AND ppmm2cc.code    = '" + code + "'" +
      "  AND ppmm.whenFit IS NOT NULL";
```

FIG. 5A

```
    if (_fitTimestampStr.length() > 0)
      _fitTimestampStr.delete(0, _fitTimestampStr.length() _ 1);

// Since MAX() is a group operation, this query is guaranteed to
    // return at most one row.
    _app.doQuery(select,
                 new BatchApp.RowProcessor()
                 {
                   public void processRow(ResultSet rs)
                   throws SQLException
                   {
                     _fitTimestampStr.append(rs.getString(1));
                   }
                 }
                );

if (_fitTimestampStr.equals(""))
    {
      throw new BatchException("No model found for channel '" + channel +
                               "', code '" + code + "'");
    } select =
      "SELECT ppmm.* " +
      "FROM    " +
      PPMModel.getTableName() + " ppmm, " +
      PPMModel2ChannelCode.getTableName() + " ppmm2cc " +
      "WHERE ppmm2cc.model    = ppmm.ID " +
      "  AND ppmm2cc.channel  = " + channel.getID() +
      "  AND ppmm2cc.code     = '" + code + "' " +
      "  AND ppmm.whenFit     = '" + _fitTimestampStr + "'";

log.debug("Model fit date = '" + _fitTimestampStr + "'");

_ppmm = (PPMModel) PPMModel.fetchBySelect(_app, select).get(0);
  } private List _getActiveContextsForModel(PPMModel ppmm)
  {
    PPMContext ppmc = new PPMContext(_app);
    ppmc.setModel(ppmm);
    return ppmc.fetchByExample();
  } private List _getSymbolsInContext(PPMContext ppmc)
  {
    PPMSymbolInContext ppmsic = new PPMSymbolInContext(_app);
    ppmsic.setContext(ppmc);
    return ppmsic.fetchByExample();
  }
```

FIG. 5B

```
public PersistentModel(BatchApp app)
{
  super(0);
  _app = app;
}
public PersistentModel(int maxOrder)
{
  super(maxOrder);
} public void setApp(BatchApp app)
{
  _app = app;
} public PPMModel getDBObj()
{
  return _ppmm;
} public void streamToDB(List channelCodeList)
{
  java.util.Date fitTimestamp = new java.util.Date();

SimpleDateFormat sdf =
    new SimpleDateFormat("yyyy_MM_dd HH:mm:ss");

if (_fitTimestampStr.length() > 0)
    _fitTimestampStr.delete(0, _fitTimestampStr.length() _ 1);

_fitTimestampStr.append(sdf.format(fitTimestamp));

_ppmm = new PPMModel(_app);
  _ppmm.setMaxOrder(_maxOrder);
  _ppmm.setWhenFit(null);  // Indicate it's completely streamed to database
or invalid
  _ppmm.setStateSize(_trueCosts._stateSize);
  _ppmm.setEntropy(_trueCosts._entropy);
  _ppmm.setSequenceLength(_totalSymbolsSeen);
  _ppmm.setNumActiveContexts(_numActiveContexts);
  _ppmm.setMeanSymsPerContext(_meanSymsPerContext);
  _ppmm.save();

Iterator iter = channelCodeList.iterator();
```

FIG. 5C

```
      PPMModel2ChannelCode ppmm2cc;
      while (iter.hasNext())
      {
        ppmm2cc = new PPMModel2ChannelCode(_app);
        ppmm2cc.setModel(_ppmm);
        ppmm2cc.setChannel((Channel) iter.next());
        ppmm2cc.setCode((String) iter.next());
        ppmm2cc.save();
      }

ModelWalker modelWalker = new ModelWalker(this, _maxOrder);
      modelWalker.restrictToActiveContexts();

ModelNode          modelNode, child;
      PPMContext         ppmc;
      PPMSymbolInContext ppmsic;
      Iterator           childNodes;
      while (modelWalker.hasNext())
      {
        modelNode = (ModelNode) modelWalker.next();

ppmc = new PPMContext(_app);
        ppmc.setModel(_ppmm);
        ppmc.setSequence(modelNode.toString());
        ppmc.setUseCount(modelNode._contextVars._contextCount);
ppmc.setPredictedSymCount(modelNode._contextVars._numPredictedChildren);
        ppmc.setStateSize(modelNode._contextVars._contextStateSize);
        ppmc.setEntropy(modelNode._contextVars._contextEntropy);
        ppmc.save();

childNodes = modelNode._children.values().iterator();

while (childNodes.hasNext())
        {
          child = (ModelNode) childNodes.next();
          if (child._contextVars._symbolInContextCount > 0)
          {
            ppmsic = new PPMSymbolInContext(_app);
            ppmsic.setContext(ppmc);
            ppmsic.setSymbol(TraceCountNode.escapeSymbol(child._symbol));
            ppmsic.setCount(child._contextVars._symbolInContextCount);
            ppmsic.save();
          }
        }

```
   // Write the single_symbol frequencies from this fit into a separate
   // table.
   TraceCountWalker countWalker = new TraceCountWalker(this, 1);

TraceCountNode countNode;
   PPMSymbolFreq  ppmsf;
   while (countWalker.hasNext())
   {
      countNode = countWalker.next();

ppmsf = new PPMSymbolFreq(_app);
      ppmsf.setModel(_ppmm);
      ppmsf.setSymbol(TraceCountNode.escapeSymbol(countNode._symbol));
      ppmsf.setFrequency(countNode._traceCount);
      ppmsf.save();
   }

// Once everything's in the database, then set the timestamp

_ppmm.setWhenFit(fitTimestamp);
   _ppmm.save();
}

// This tosses out whatever state was in the model prior to invocation.
public void streamMostRecentFromDB(Channel channel, String code)
throws BatchException
{
   _getMostRecentModel(channel, code);
   _maxOrder              = _ppmm.getMaxOrder();
   _trueCosts._stateSize  = _ppmm.getStateSize();
   _trueCosts._entropy    = _ppmm.getEntropy();
   _totalSymbolsSeen      = _ppmm.getSequenceLength();
   _numActiveContexts     = _ppmm.getNumActiveContexts();
   _meanSymsPerContext    = _ppmm.getMeanSymsPerContext();
   _isEmpty               = (_numActiveContexts == 0);
   _root                  = new ModelNode();

List              ppmcList = _getActiveContextsForModel(_ppmm);
   Iterator          ppmcIter = ppmcList.iterator();
   List              ppmsicList;
   Iterator          ppmsicIter;
   PPMContext        ppmc;
   PPMSymbolInContext ppmsic;
   ModelNode         modelNode, childNode;
   String            escapedSequence;
```

FIG. 5E

```
    while (ppmcIter.hasNext())
    {
       ppmc = (PPMContext) ppmcIter.next();

escapedSequence = ppmc.getSequence();
       char[] contextTrace = TraceCountNode.unescapeSequence(escapedSequence);

// Put this context into the forward tree.
       modelNode = (ModelNode) _root;
       for (int curPos = 0; curPos < contextTrace.length; curPos++)
       {
          modelNode._contextVars._numActiveContextDescendants++;
          modelNode = (ModelNode)
modelNode._getOrAddChild(contextTrace[curPos]);
       }

// Populate the context state.
       modelNode._traceLength = contextTrace.length;
       modelNode._contextVars._contextCount = ppmc.getUseCount();
       modelNode._contextVars._numPredictedChildren =
          ppmc.getPredictedSymCount();
       modelNode._contextVars._contextEntropy = ppmc.getEntropy();
       modelNode._contextVars._contextStateSize = ppmc.getStateSize();
       modelNode._contextVars._contextIsUsedInModel = true;

// Put this context's predicted symbols in as children.
       ppmsicList = _getSymbolsInContext(ppmc);
       ppmsicIter = ppmsicList.iterator();

while (ppmsicIter.hasNext())
       {
          ppmsic = (PPMSymbolInContext) ppmsicIter.next();

childNode = (ModelNode)
                   modelNode._getOrAddChild(TraceCountNode.
unescapeSymbol(ppmsic.getSymbol()));

childNode._contextVars._symbolInContextCount = ppmsic.getCount();
       }
    }
  }
}
```

FIG. 5F

```
// NAME: TraceCountNode
//
// DESCRIPTION:
//
//   A node in a trace_counting "forward tree". A forward tree maintains
//   information about "traces", or sequences of symbols. To read off the
//   trace belonging to a particular TraceCountNode, start at the root
//   of the tree and descend to that node, reading off the symbols at each
//   node encountered (including the destination node). The result is the
//   trace, read in left_to_right order.
// package com.vindigo.build.PPM;

import java.util.*;

public class TraceCountNode
{
  // Escape special symbols in the input symbol sequence when they are
  // printed or otherwise output.
  //
  // WARNING: Classes in this package assume the escaped output is
  //          a backslash followed by a three_letter code, e.g. "\EOL".
  public static final char NUL =   0;    // ASCII NUL
  public static final char EOL =  10;    // ASCII LF
  public static final char SPC =  32;    // ASCII space
  public static final char BSL =  92;    // ASCII backslash
  public static final char ESC = 127;    // ASCII DEL public static String escapeSymbol(char symbol)
  {
    String escapedSymbol;

switch (symbol)
    {
    case NUL:
      escapedSymbol = "\\NUL";
      break;
    case EOL:
      escapedSymbol = "\\EOL";
      break;
    case SPC:
      escapedSymbol = "\\SPC";
      break;
    case BSL:
      escapedSymbol = "\\BSL";
      break;
    case ESC:
      escapedSymbol = "\\ESC";
      break;
    default:
      escapedSymbol = String.valueOf(symbol);
      break;
    }
```

FIG. 6A

```
    return escapedSymbol;
} public static char unescapeSymbol(String escapedSymbol)
{
  char symbol;

if (escapedSymbol.equals("\\NUL"))
    symbol = NUL;
  else if (escapedSymbol.equals("\\EOL"))
    symbol = EOL;
  else if (escapedSymbol.equals("\\SPC"))
    symbol = SPC;
  else if (escapedSymbol.equals("\\BSL"))
    symbol = BSL;
  else if (escapedSymbol.equals("\\ESC"))
    symbol = ESC;
  else
    symbol = escapedSymbol.charAt(0);

return symbol;
} public static char[] unescapeSequence(String escapedSequence)
{
  StringBuffer sequence  = new StringBuffer(escapedSequence);
  int          position  = escapedSequence.length();

while ((position = escapedSequence.lastIndexOf(BSL, position _ 1)) > _1)
  {
    sequence.
    replace(position, position + 4,
            String.valueOf(unescapeSymbol(escapedSequence.
                                          substring(position,
                                                    position + 4))));
  } return sequence.toString().toCharArray();
}

// Pointer to this node's parent.
protected TraceCountNode _parent;

// Links to TraceCountNodes for all the traces that result from
// appending one symbol to this trace. Each key is such a subsequent
// symbol, and the value is the corresponding TraceCountNode.
protected HashMap _children;

// The right_most symbol of the trace that ends at this node.
protected char _symbol;
public    char getSymbol()
{
  return _symbol;
}
```

FIG. 6B

```
// The number of occurrences of the trace corresponding to this node.
protected int _traceCount;
public    int getTraceCount()
{
  return _traceCount;
}

// The number of symbols in the trace corresponding to this node.
protected int _traceLength;

// If this node is for the trace <a_1 ... a_k>, this link is to the node
// for the next lower_order trace <a_2 ... a_k>. Remember, that's *NOT*
// in general the parent of this node __ the parent here corresponds to
// the trace <a_1 ... a_(k_1)>, which won't usually be identical to
// <a_2 ... a_k>.
protected TraceCountNode _subTraceVine;

// Constructor for all non_root nodes.
protected TraceCountNode(char symbol, TraceCountNode parent,
                        TraceCountNode subTraceVine)
{
  _symbol      = symbol;
  _parent      = parent;
  _subTraceVine = subTraceVine;
  _traceLength = _parent._traceLength + 1;
}

// Constructor for the root node.
protected TraceCountNode()
{
  _symbol      = 0;
  _parent      = this;
  _subTraceVine = this;
  _traceLength = 0;
}

// The allocation and initialization of a child node is handled in
// this method so that subclasses can override it.
protected TraceCountNode _createChild(char           symbol,
                                      TraceCountNode parent,
                                      TraceCountNode subTraceVine)
{
  return new TraceCountNode(symbol, parent, subTraceVine);
} protected TraceCountNode _getOrAddChild(char childSymbol)
{
  TraceCountNode child;
  Character      childSymObj      = new Character(childSymbol);
  boolean        didCreateChildMap = false;
```

FIG. 6C

```
    if (_children == null)
    {
      _children = new HashMap();
      didCreateChildMap = true;
    } if (didCreateChildMap ||
        (child = (TraceCountNode) _children.get(childSymObj)) == null)
    {
      // If (_subTraceVine == this), then this node is the root of the
      // forward tree, so the new child's sub_trace vine should just
      // point here. Otherwise it should point to that child of this
      // node's _subTraceVine which corresponds to childSymbol.
      //
      // For example, is this node is for "cac", and childSymbol is "b",
      // then the sub_trace vine for the new child node "cacb" is
      // obtained by following this node's sub_trace vine to "ac", then
      // finding its child node "acb". Got it?
      TraceCountNode vineForChild =
         ((_subTraceVine == this)                   ?
            this                                    :
            _subTraceVine._getOrAddChild(childSymbol));

child = _createChild(childSymbol, this, vineForChild);

_children.put(childSymObj, child);
    } return child;
  } public String toString()
  {
    if (_parent == this)
    {
      // Base case: root of the tree.
      return "";
    } return _parent.toString() + escapeSymbol(_symbol);
  } public String toStringRaw()
  {
    if (_parent == this)
    {
      // Base case: root of the tree.
      return "";
    }
    return _parent.toStringRaw() + _symbol;
  }
}
```

FIG. 6D

```
// NAME: TraceCounts
//
// DESCRIPTION: A forward tree used to count the occurrences of all traces
//              in a target symbol sequence to be modelled, with a
//              corresponding interface.
// package com.vindigo.build.PPM;

public class TraceCounts
      implements Cloneable
{
  // The root of the trace_counting forward tree.
  protected TraceCountNode _root;

// The total number of symbols encountered thus far.
  protected int _totalSymbolsSeen;

public TraceCounts()
  {
    _root = new TraceCountNode();
  }

// Add one to the trace count for the trace at this node as well as all
  // of its subtraces, including the null trace.
  protected void _increment(TraceCountNode node)
  {
    TraceCountNode prevNode, vineSwinger;

for (prevNode = null, vineSwinger = node;
         prevNode != vineSwinger;
         prevNode = vineSwinger,
         vineSwinger = vineSwinger._subTraceVine)
    {
      vineSwinger._traceCount++;
    }
  }
```

FIG. 7A

```java
    public void updateFromSequence(final char[] symSequence, int
maxTraceLength)
    {
      char           curSymbol;
      TraceCountNode curParent, curNode;

// The node in the forward tree corresponding to the longest trace
      // processed in the previous update step. All the suffix subtraces
      // (which were also updated in the previous step) can be reached via
      // the vine pointer chain starting at this node. We start off with
      // the null trace, i.e., the root of the forward tree.
      TraceCountNode prevNode = _root;

for (int curPos = 0; curPos < symSequence.length; curPos++)
      {
        curSymbol = symSequence[curPos];

// If we just finished processing a trace of maximal length, we have
        // to drop its first symbol (by following its sub_trace vine) in
        // order to make room at the end for the new symbol. If not, we can
        // just add the new symbol to the end.
        curParent =
           ((curPos + 1 <= maxTraceLength) ? prevNode : prevNode._subTraceVine);

curNode = curParent._getOrAddChild(curSymbol);
        _increment(curNode);

prevNode = curNode;
      }

_totalSymbolsSeen += symSequence.length;
    } public String toString()
    {
      TraceCountNode node;
      TraceCountWalker tcw = new TraceCountWalker(this);

String str = "Sequence length: " + _root._traceCount + "\n";

// Skip the root node, since we just printed it out.
      if (tcw.hasNext())
        tcw.next();

while (tcw.hasNext())
      {
        node = tcw.next();
        str += node + " " + node._traceCount + "\n";
      } return str;
    }
}
```

FIG. 7B

```
// NAME: TraceCountWalker
//
// DESCRIPTION: Iterate over every trace present in a TraceCounts object.
// package com.vindigo.build.PPM;

import java.util.*;

public class TraceCountWalker
{
  private TraceCounts _traceCounts;
  private LinkedList _nodeQueue = new LinkedList();

// The maximum trace length to report in the walk.
  private int _maxTraceLength = _1;

// Returns true if the given node passes all filtering restrictions.
  // Subclasses should override this with any necessary filtering behavior.
  protected boolean _isValid(TraceCountNode node)
  {
    return (node._traceCount > 0 && node._traceLength > 0 &&
            (_maxTraceLength == _1 || node._traceLength <= _maxTraceLength));
  }

// Returns true if encountering this node allows the walker to conclude
  // that all remaining nodes will be invalid, so that no more work is
  // required. Subclasses should override this as required.
  protected boolean _nodeShortCircuitsWalk(TraceCountNode node)
  {
    return (_maxTraceLength > _1 && node._traceLength > _maxTraceLength);
  } protected void _searchForValidNode()
  {
    TraceCountNode node;

while (_nodeQueue.size() > 0 &&
           ! _isValid((TraceCountNode) _nodeQueue.getFirst()))
    {
      node = (TraceCountNode) _nodeQueue.removeFirst();

if (_nodeShortCircuitsWalk(node))
      {
        _nodeQueue.clear();
        return;
      } if (node._children != null && node._children.size() > 0)
        _nodeQueue.addAll(node._children.values());
    }
  }
```

FIG. 8A

```
private void _init(TraceCounts traceCounts, int maxTraceLength)
{
  _traceCounts    = traceCounts;
  _maxTraceLength = maxTraceLength;
  reset();
} public TraceCountWalker(TraceCounts traceCounts)
{
  _init(traceCounts, _1);
} public TraceCountWalker(TraceCounts traceCounts, int maxTraceLength)
{
  _init(traceCounts, maxTraceLength);
} public void reset()
{
  _nodeQueue.clear();
  _nodeQueue.add(_traceCounts._root);
  _searchForValidNode();
} public boolean hasNext()
{
  return (_nodeQueue.size() > 0);
} public TraceCountNode next()
{
  if (_nodeQueue.size() == 0)
    throw new NoSuchElementException();

TraceCountNode node = (TraceCountNode) _nodeQueue.removeFirst();

if (node._children != null && node._children.size() > 0)
    _nodeQueue.addAll(node._children.values());

_searchForValidNode();

return node;
  }
}
```

FIG. 8B

```
#ifndef COMPRESSEDSTRINGRESOURCE_H
define COMPRESSEDSTRINGRESOURCE_H ifndef VINDIGORESOURCE_H
include "VindigoResource.h"
#endif
#ifndef RESOURCEARRAYPTR_H
#include "ResourceArrayPtr.h"
endif // Version 0 of the Vindigo compression used a limited set (<50 contexts)
// Version 1 used a prediction_by_partial match (PPM) algorithm.

// Reviews need a big buffer, so maxDecompStringLength is much bigger than before.
// FindBusinessAddress() makes a local copy of the buffer so it needs to know the
// smaller size used by addresses.
#define maxDecompStringLength       1250
#define maxAddrDecompStringLength   45          // max in alpha addr data set was 39
#define ppmMaxOrder                 (3)         // length of longest context
#define ppmActiveFlagMask           (0x80)      // bit that indicates context is active (has Huffman tree)
#define ppmAlphabetSize             (128)       // characters in alphabet
define ppmHuffmanTerminalNode      (0x80)      // bit mask indicating terminal node define ppmFlagSorted               (0x01)      // flag indicating sort index is present
define ppmSortedIndexEntries       (27)        // one index per letter and an extra // @todo clean this up
define maxStringRecords 15
#define NUL                         0           // 0x00, used to separate strings in bunches
#define EOL                         10          // 0x0a, the end of the line
#define BAD                         127         // 0x7f, the escape symbol (bad symbol)

typedef struct
{
  UInt8*       addr;
  UInt16       childcount;                      // Number of child contexts from the current one
  Boolean      active;
}
PPMContext;
```

FIG. 9A

```cpp
class CompressedStringResource : public VindigoResource
{
public:
    virtual Boolean open(UInt32 type, UInt16 id);
    virtual void close();
    inline Int16 getNumStrings() const;
    Char* getString(Int16 index) const;
    static void capitalize(Char* string);
    void getCharMatchRange(Char c, UInt16 *startSortPos, UInt16 *endSortPos) const;
    void getMatchRange(const Char *prefix, UInt16 *startSortPos, UInt16 *endSortPos) const;
    inline UInt16 getSortPosIndex(UInt16 sortPos) const;

// these are convenient to make the interface of
    // CompressedStringResource look like UncompressedStringResource,
    // so it's easy to switch one for the other.
    inline UInt16 getNumItems() const { return getNumStrings(); }
    inline Char* operator[](Int16 index) { return getString(index); } protected:
private:
    Char* decompressString(const UInt8* data, UInt16 x, Int16 index) const;
    UInt8 getNextByte(const UInt8 **thedata) const;
    void cleanup();

inline const UInt8* getHuffTreePtr(const PPMContext& context) const;
    const UInt8* findNullContext () const;
    const UInt8* findNextContext (const UInt8 previousLetter) const;       //
@todo not const? could be inline, I think VindigoResource* _extraResources;
public: // temporarily public until everyone has version 2 of everything
    UInt16              HuffVersion;                            // Compression
Version: 0=original, 1=PPM, 2=PPM + SortPositions reversed
private:
    UInt16              NumStringsInSet;                // How many business
strings in a set?
    UInt16              NumSetsInRecord;                // How many sets in a
record?
    UInt16              NumStringsInRecord;                     // product of
previous two values
    UInt16              NumStrings;                                // How many
strings are there total?
    UInt16              NumRecords;                             // How many Palm
records do we use?
```

FIG. 9B

```
    UInt16          NumHuffNodes;                   // How many nodes
are in the huff tables?
    UInt16          NumHuffTables;                  // How many huff
tables are there?
    const UInt8*    whichhuff;                      // Pointer to the table
mapping symbol to huff table #
    huffnode        **tables;                       // Array of pointers to
the root nodes of huff tables
    const UInt8*    Record[maxStringRecords];       // The actual compressed
data.
    RESOURCEARRAYPTR(const UInt16) SetOffset;       // Pointer to the array of
set offsets
    static UInt16 bitnum;
    PPMContext*     context;                        // Array of
contexts
    UInt16          childcount;                     // Number of
child contexts from the current one
    Char*           PPMAlphabet;                    // pointer to the
alphabet
    UInt8*          PPMContextBaseAddr;             // Base address
for context zero public:
    // @todo Move following to private after FindBusinessAddress cleaned up.
    RESOURCEARRAYPTR(const UInt16) SortPositions;
    // in V0,1 index is string position, value is sort position
    // in V2 index is sort position, value is string position RESOURCEARRAYPTR(const UInt16) CharStart;       // Pointer to array of 27
ids, one for a_z and
    // one for the end.  Crucial to fast prefix lookups!
    // Note that the CharStart values are indexes into
    // the SortPositions array below.
    // @todo Move following to private after FindBusinessesSortName cleaned up.
    static Char decompbuf[maxDecompStringLength];
};

inline Int16 CompressedStringResource::getNumStrings() const
{
    return(NumStrings);
} inline UInt16 CompressedStringResource::getSortPosIndex(UInt16 sortPos) const
{
    return SortPositions[sortPos];
}
```

FIG. 9C

```
inline const UInt8* CompressedStringResource::getHuffTreePtr(const
PPMContext& context) const
{
  return  context.addr +
          sizeof (UInt8)  + // Child count/active flag
          (context.childcount * (sizeof (Char) + sizeof (UInt16))); // Child
letters and context offsets
} endif
```

FIG. 9D

```cpp
// VindigoRsrc is used for testing on palm
#ifdef DEVELOPER_TESTING
#include "VindigoRsrc.h"
#endif
#include "CompressedStringResource.h"
#ifndef RESOURCEDATAPTR_H
#include "ResourceDataPtr.h"
endif include "StringUtil.h"

UInt16 CompressedStringResource::bitnum = 0x8000;
Char CompressedStringResource::decompbuf[maxDecompStringLength];

Boolean CompressedStringResource::open(UInt32 type, UInt16 id)
{

UInt16    numsets;
  UInt16    resourceflags;

if (isOpen())
    return(true);

tables = NULL;
  context = NULL;
  _extraResources = NULL;

if (!VindigoResource::open(type, id))
    return(false);

ResourceDataPtr ptr(getPtr());

HuffVersion = ptr.getUInt16();
  ptr += sizeof(UInt16);      // version

Int16 i;

NumStringsInSet = ptr.getUInt16();
  ptr += sizeof(UInt16);
  NumSetsInRecord = ptr.getUInt16();
  ptr += sizeof(UInt16);
  NumStringsInRecord = NumSetsInRecord * NumStringsInSet;
  NumStrings = ptr.getUInt16();
  ptr += sizeof(UInt16);
  NumRecords = ((NumStrings _ 1) / NumStringsInRecord) + 1;
  numsets = (((NumStrings _ 1) / NumStringsInSet) + 1);

if (HuffVersion == 1 || HuffVersion == 2 || HuffVersion == 3)
  { // PPM version resourceflags = ptr.getUInt16();
    ptr += sizeof (UInt16);
```

FIG. 10A

```
    SETRESPTR(SetOffset, (const UInt16*)ptr.getRawPtr());
    ptr += numsets * sizeof (UInt16);

if (resourceflags & ppmFlagSorted)
    {
      i = NumStrings / NumStringsInSet;
      if (NumStrings % NumStringsInSet != 0)
        ++i;

CharStart = (UInt16 *) (ptr.getRawPtr());
      ptr += ppmSortedIndexEntries * sizeof (UInt16);

SortPositions = (UInt16 *) (ptr.getRawPtr());
      ptr +=  (NumStrings * sizeof(UInt16));
    }

PPMAlphabet = (Char *) ptr.getRawPtr();
    ptr += (ppmAlphabetSize * sizeof (Char)) + sizeof (UInt16);
      // skip alphabet and context count PPMContextBaseAddr = (UInt8 *)(ptr.getRawPtr());

context = new PPMContext[ppmMaxOrder+1];
    if (context == NULL)
    {
      cleanup();
      return false;
    } context[0].active = true;
    context[0].addr = PPMContextBaseAddr;
    context[0].childcount = *(context[0].addr) & ~ppmActiveFlagMask;
  }
  else
  {
    return false;
  }

_extraResources = new VindigoResource[NumRecords];
  if (_extraResources == NULL)
  {
    cleanup();
    return(false);
  }
```

FIG. 10B

```
  for (i=0; i<NumRecords; i++)
  {
    if (!_extraResources[i].open(type, (id + i + 1)))
    {
      cleanup();
      return(false);
    }
    Record[i] = (UInt8*)_extraResources[i].getPtr().getRawPtr() +
sizeof(UInt16);
  }
  return(true);
} void CompressedStringResource::close()
{
  if (!isOpen())
    return;
  cleanup();
}

Char* CompressedStringResource::getString(Int16 index) const
{
  // Return value is good only until the next invocation of FindString
  UInt16 tableNum, setNum;
  Char* result;
  tableNum = index / NumStringsInRecord;
  setNum = index / NumStringsInSet;          // The number of this set
over all business names if ((index >= NumStrings) ||
      (tableNum >= NumRecords) ||
      (setNum >= (NumSetsInRecord * NumRecords)))
  {
    return "";
  } result = decompressString(Record[tableNum] + SetOffset[setNum],
                            index _ (setNum * NumStringsInSet), index);

// capitalize applies in_place...
  capitalize(result);

return result;
} // FindString
```

FIG. 10C

```
Char* CompressedStringResource::decompressString(const UInt8* data, UInt16 x,
Int16 index) const
{
  //
  // Retrieve the xth string from the data block
  // Return value is good only until the next invocation of DecompressString
  //

UInt16              buflen;
  const UInt8*        currdata = data;
  Boolean             end_of_word;
  UInt16              thebit;
  Char       .        thesymbol;
  const UInt8*              huffmantreeptr;

// we don't check decompbuf for overflow here;
  // we're relying on the server...

bitnum = 0x0080;

Char      lineSeparator = EOL;
  if(HuffVersion > 2)
    lineSeparator = NUL;

huffmantreeptr = findNullContext(); // Force to null context, clear vine
  x++;
  while (x != 0)
  {
    buflen = 0;                                                      // Empty
buffer
    end_of_word = false;
    while (!end_of_word)
    {

//
      // Read the next bit.  This code taken from ReadBitFromWord(),
      // but we put it here for speed.
      //
      //     thebit = ReadBitFromWord((UInt16 **)&currdata);
      //
      thebit = *currdata & bitnum;
      bitnum >>= 1;
      if (bitnum == 0)
      {
        bitnum = 0x0080;
        ++currdata;
      } if (thebit)
      {
        huffmantreeptr += 1;  // take the right byte of the pair
      }
```

FIG. 10D

```
        if (*huffmantreeptr & ppmHuffmanTerminalNode)
        {
          thesymbol = *huffmantreeptr & ~ppmHuffmanTerminalNode;
          if (thesymbol != BAD)
            thesymbol = PPMAlphabet[thesymbol];
          huffmantreeptr = findNextContext ((UInt8)thesymbol);

if (thesymbol == BAD)
            thesymbol = getNextByte(&currdata);

decompbuf[buflen] = thesymbol;
          if (thesymbol == lineSeparator)
          {
            end_of_word = true;
          }
          else
          {
            buflen++;
          }

}
        else
        {                  // non_terminal node, skip ahead in this tree
          huffmantreeptr += (*huffmantreeptr) * 2;      // Two bytes per node
          if (thebit)
          {   // Were you on the right (not left) node? Back up.
            huffmantreeptr__;
          }
        } ifdef DEVELOPER_TESTING
        if (buflen == maxDecompStringLength)
        {
          FrmCustomAlert(GenericAlert, "String resource too long!", "", "");
          decompbuf[buflen_1] = 0;
          return decompbuf;
        }
endif }
      x__;
  } decompbuf[buflen] = 0;

return decompbuf;
}
```

FIG. 10E

```
void CompressedStringResource::capitalize(Char* string)
{
  // Scan through the string to see if there's any uppercase.
  // If there are no uppercase letters, then capitalize it.
  // Capitalization happens in_place.  Capitalize the first letter too.
  Char* tmpPtr = string;
  Boolean spaceseen = true;

// look for uppercase letters
  while (*tmpPtr != '\0')
  {
    if ((*tmpPtr >= 'A') && (*tmpPtr <= 'Z'))
    {
      return;
    }
    tmpPtr++;
  }

// if we're still here, that means there were no uppercase
  // letters. go ahead and capitalize...
  tmpPtr = string;
  while (*tmpPtr != '\0')
  {
    if (spaceseen)
    {
      if ((*tmpPtr >= 'a') && (*tmpPtr <= 'z'))
      {
        *tmpPtr += 'A' _ 'a';
      }
    }
    spaceseen = ((*tmpPtr == ' ') || (*tmpPtr == '.'));
    tmpPtr++;
  }
}

//
// jake suggested this could be sped up by using something like duff's device
//
// that could help __ but we'd have to keep another static
// bit_counter around for the switch statement
//
UInt8 CompressedStringResource::getNextByte(const UInt8 **thedata) const
{
  UInt16    result = 0;
  UInt16    i;
  UInt16    thebit;
```

FIG. 10F

```
  for (i=0; i<8; i++)
  {
    // read the bit   (this code copied from ReadBitFromWord)
    thebit = **thedata & bitnum;
    bitnum >>= 1;
    if (bitnum == 0)
    {
      bitnum = 0x0080;
      (*thedata)++;
    } if (thebit)
    {
      result = result | 0x01;
    }
    result <<= 1;
  } result >>= 1;
  return (result & 0x00FF);
} void CompressedStringResource::cleanup()
{
  Int16 recordIndex;

if (_extraResources != NULL)
  {
    for (recordIndex = 0; recordIndex < NumRecords; recordIndex++)
      _extraResources[recordIndex].close();
    delete []_extraResources;
  } if (tables != NULL)         // PPM Compression doesn't use this, hence it's
NULL
  {
    delete []tables;
  } if (context != NULL)        // This is used by PPM
  {
    delete []context;
  }

VindigoResource::close();
}
```

FIG. 10G

```
/** Resets state of the contexts, returns reference to NULL context */
const UInt8* CompressedStringResource::findNullContext () const
{
  // Specifically want to move to null context, clear out vine
  for (int i = 1; i < ppmMaxOrder; i++)
  {
    context[i].active = false;
    context[i].addr = NULL;
  } return getHuffTreePtr(context[0]);
} const UInt8* CompressedStringResource::findNextContext (const UInt8
previousLetter) const
{

UInt16                    i;                          // Counter
  PPMContext*               hoc;                        // Next higher_order context
  PPMContext*               loc;                        // Lower_order context
  UInt16                    child;                      // array index
  UInt8*                    l;                          // letter you're considering
  UInt8*                    ptr;                        // Pointer to/into context bytestream hoc = &(context[ppmMaxOrder]);        // Initialize highest order context for (i = 0; i < ppmMaxOrder; i++)
  {

// Update all the context pointers so you're ready for the next search loc = hoc _ 1;
    ptr = loc _> addr;   // lower_order context if (ptr)
    { // Pointer is null when high_order contexts don't exist
      // and for all high_order contexts during initialization ptr += sizeof (UInt8);   // Skip childcount
```

FIG. 10H

```
        hoc _> addr = NULL;                    // Assume next context doesn't
exist, therefore inactive as well l = ptr;              // point to letter for first child context for (child = 0; child < loc _> childcount; child++)
        {           // Yes, it's a linear search
          if (*l == previousLetter)
          {

// If you find a match, skip over all the child letters and
            // over the non_matching context offsets.

ptr += (sizeof (UInt8) * loc _> childcount) + (sizeof (UInt16) *
child);

hoc _> addr = PPMContextBaseAddr + ((*ptr << 8) + *(ptr+1));
        // base + offset
            hoc _> childcount = *(hoc _> addr) & ~ppmActiveFlagMask;
            hoc _> active = *(hoc _> addr) & ppmActiveFlagMask;

break;
          }
          l += sizeof (UInt8);       // Go to the next
        }
      }
      else
      {
        hoc _> addr = NULL;
      } hoc__;
    } for (i = ppmMaxOrder; i >= 0; i__ )
    {
      if ((context[i].addr) && (context[i].active))
      {
        break;
      }
    } return getHuffTreePtr(context[i]);
}
```

FIG. 10I

```
void CompressedStringResource::getCharMatchRange(Char c, UInt16
*startSortPos, UInt16 *endSortPos) const
{
  if (c < 'a')
  {
    *startSortPos = 0;
    *endSortPos = CharStart[0];
  }
  else if (c <= 'z')
  {
    *startSortPos = CharStart[c_'a'];
    *endSortPos = CharStart[c_'a'+1];
  }
  else
  {
    *startSortPos = CharStart[26];
    *endSortPos = NumStrings;
  }
} void CompressedStringResource::getMatchRange(const Char *prefix, UInt16
*startSortPos, UInt16 *endSortPos) const
{
  Char *p = NULL;

UInt16 prefixLen = (UInt16) StringUtil::strlen(prefix);
  Boolean notFound;
  if (prefixLen == 0)
  {
    // if it's the empty string, no matches
    *startSortPos = *endSortPos = NumStrings;
    goto done;
  } p = StringUtil::strdup(prefix);
  StringUtil::toLower(p, p);

getCharMatchRange(p[0], startSortPos, endSortPos);

if (prefixLen == 1 && p[0] >= 'a' && p[0] <= 'z')
    // if the string is only 1 character and it's alphabetic, we've already
got the range
    goto done;

if (*endSortPos <= *startSortPos)
    goto done; // if there are no strings in range, we're done.

// this is a modified binary search: we're trying to find the first or last
string whose
  // prefix matches. that means we can't just stop when we find a match, but
instead have to
  // shrink the range in the appropriate direction (end = mid or start = mid
depending on whether
  // we're looking for the first or last string).
```

FIG. 10J

```
    // our loop invariant is that the string we're looking for is between start
and end, inclusive.
    // the range shrinks every time through except for the case where start ==
end, and we check for
    // that.

notFound = true;
    Int16 start, end;
    Int16 pass;

// pass 0 finds the first match, pass 1 finds the last
    for (pass = 0; pass < 2; pass++)
    {
        if (pass == 0)
            start = *startSortPos;
        end = *endSortPos _ 1;      // Points to the last entry while (start <= end)
        {
            // here + pass makes integer arithmetic round the result favoring
larger
            // values in case we are looking for last match
            // this makes loop symmetric and exit condition becomes the same for
both
            // cases
            Int16 mid = (start + end + pass) / 2;
            Int16 index = getSortPosIndex(mid);
            Char *s = getString(index);
            StringUtil::toLower(s, s);
            Int16 cmp = (Int16) StringUtil::strncmp(s, p, prefixLen);

if (cmp == 0)
            { // s == prefix
                if (pass == 0)
                    end = mid;
                else
                    start = mid;

notFound = false;
                if (start == end)
                    break;
            }
            else if (cmp < 0) // s < prefix
                start = mid + 1;
            else // s > prefix
                end = mid _ 1;
        }
```

FIG. 10K

```
    if (pass == 0 && notFound)
    {
       // if we don't match any strings while looking for the first string,
don't bother to look for
       // the last string.
       *startSortPos = *endSortPos = 0;
       // here we return 0 which is not different from returning 0 in the case
       // where it actually matches exactly one element at the beginning of
the
       // list. ??? Is that wrong ???
       goto done;
    } if (pass == 0)
      *startSortPos = start;
    else
      *endSortPos = end + 1;
  }
done:
  delete[] p;
  return;
}
```

FIG. 10L

PPM-BASED DATA COMPRESSION

CROSS-REFERENCE TO RELATED APPLICATION

This application claims priority from U.S. Provisional Patent Application Ser. No. 60/284,003, entitled COMPRESSION METHOD, by inventors McAuliffe and Joerg, filed Apr. 16, 2001, which prior application is incorporated herein by reference.

FIELD OF THE INVENTION

The present invention relates generally to lossless data compression techniques and, more particularly, to data compression techniques based on Prediction by Partial Matching ("PPM") methods.

BACKGROUND OF THE INVENTION

Data compression is widely used in modern data communication, transmission, and storage systems. The basic aim of data compression is to encode (or compress) a message into an equivalent, but shorter, compressed message. The compressed message can then be transmitted or stored using fewer bits and, when need, can be decoded (or uncompressed) to recreate the original message.

At the most fundamental level, data compression methods are characterized into two distinct classes: (i) lossless compression and (ii) lossy compression. In lossless compression, the process of encoding, then decoding, a message will always produce a perfect recreation of the original message—i.e., there is no data loss, hence the name lossless compression. With lossy compression, on the other hand, the process of encoding, then decoding a message, will not always produce an exact copy of the original message. Instead, the compression/decompression process may result in certain errors, or data loss. Such errors are typically small, and hopefully imperceptible by the user of the data. MP3 is a good example of lossy compression: Although the process of encoding, then decoding, a song using the MP3 standard will significantly alter the original bit stream, the user will not perceive a problem, since the song still "sounds" the same. Generally speaking, lossy data compression is used for sound and image files, whereas lossless data compression is used for text and data files.

In data compression, the term "compression ratio" refers to the ratio of the compressed message size to the uncompressed message size. Thus, a compression ratio of 0.5 implies that the compressed message is half the size of the original message.

The basic idea behind all data compression algorithms is to identify and exploit patterns in the data to be compressed, and to apply the greatest compression to the most commonly appearing patterns. For example, if the data to be compressed is ASCII text that represents written English, most people would realize that the most commonly appearing character is "e," whereas characters like "x" and "z" are relatively uncommon. ASCII represents all characters using 7-bit patterns. While 7 bits represents the fewest number of bits that can be used to assign fixed-length codes to all characters, one can achieve better compression of English text by varying code lengths, and assigning shorter codes to the most common characters (e.g., 2 or 3 bits for an "e") and longer codes to the least common characters (e.g., 9 or 10 bits for an "x" or "z"). Utilizing the well-known Huffman algorithm to optimally assign variable-length codes to ASCII characters results in a compression ratio of about 0.59 for English text. This, however, is still far from optimal, since the best known compression algorithm achieve compression ratios of about 0.2 for English text.

To key parts of any data compression algorithm are: (i) the model and (ii) the coder. The model component predicts the likelihood that a given symbol (e.g., a character) will appear in the message. In the ASCII English text example discussed above, the model was "context independent" because, for example, it predicts that "e" will be the most likely character, regardless of where one is in the text. More complex and powerful data models are "context dependent" because they may consider the context (e.g., what character(s) immediately precede the current character) in predicting what the next character will most likely be. For example, if one is encoding English text, a context dependent model would predict that the most likely character to follow a "q" would be "u," rather than "e."

In the data compression field, context dependent models are typically characterized as "first order," "second order," "third order," and so on. A first order model is one that considers the preceding symbol in predicting the current symbol. A second order model considers the last two symbols. And a third order model considers the last three symbols. (Note, a "zero order" model is the same as a context independent model.) Because computational complexity grows super-exponentially with the order of a model, low-order data models (e.g., second or third order) are typically used in practice.

With a data model in place, the coder component then uses the symbol probabilities predicted by the data model to assign a code to each possible symbol. Here, the well-known Huffman algorithm can be used to produce an optimal assignment of codes (i.e., shortest codes for most common symbols, etc.) for a given data model. Alternatively, one can employ well-known arithmetic coding techniques, which are often superior for highly repetitive data streams.

Over the past decade, so-called PPM-based algorithms have achieved the best overall compression performance (i.e., lowest compression ratios). However, PPM-based algorithms tend to be slow. An "order-k" PPM algorithm uses an order-k context dependent data model, but with a twist. The twist occurs when the algorithm encounters a k-length context that it has never been seen before; in this case, it attempts to match the shorter (k−1)-length sub-context using a (k−1)-order data model. Attempts at this "partial matching" continue, using successively lower-order data models, until either (i) a sub-context is partially matched or (ii) a zero-order (i.e., context independent) data model is used.

The speed problem with PPM-based algorithms stems from the fact that the number of potential order-k PPM data models grows as the powerset of k. Hence, even for a modest value of k, choosing an appropriate PPM data model from among the vast number of alternatives can pose a computationally intractable task. Traditional PPM algorithms compute a new data model for each message to be encoded, thus not allowing the cost of the computationally-expensive model building task to be amortized over many compression/decompression cycles.

In light of the above, there exists a present need for improved methods, apparatus, articles-of-manufacture, and coded data signals that reduce the computational complexity of PPM-based data compression. And there exists a present need for such improved methods, apparatus, articles-of-manufacture and coded data signals that permit the cost of the computationally-expensive model building task to be amortized over many compression/decompression cycles and/or scheduled such that it minimizes user-perceptible service disruptions. The invention, as described below and in the accompanying figures, addresses these needs.

SUMMARY OF THE INVENTION

In light of the above, one aspect of the invention relates to improved methods, apparatus, articles-of-manufacture, and coded data signals that reduce the computational complexity of PPM-based data compression through use of certain simplifying assumptions that permit faster search for a close-to-optimal PPM model than conventional techniques.

Another aspect of the invention relates to improved methods, apparatus, articles-of-manufacture, and coded data signals, for use in a PPM-based data compression system, that permit the cost of the computationally-expensive model building task to be amortized over many compression/decompression cycles by maintaining a PersistentModel class, accessible to both the coder and decoder side of the system.

Still another aspect of the invention relates to improved methods, apparatus, articles-of-manufacture, and coded data signals, for use in a PPM-based data compression system, that permit the computationally-expensive model building task to be performed only occasionally, as opposed to each time a message is coded.

And yet another aspect of the invention relates to improved methods, apparatus, articles-of-manufacture, and coded data signals, for use in a PPM-based data compression system, that permit the computationally-expensive model building task to be scheduled such that it minimizes user-perceptible service disruptions.

Accordingly, generally speaking, and without intending to be limiting, one form of the invention may comprise methods, systems, articles-of-manufacture, or coded data signals characterized by: (a) providing a string to be compressed; (b) selecting an approximately optimal PPM model for the string by: (i) providing an objective function that measures the desirability of proposed PPM models; (ii) starting with i=1, determining an order-i PPM model for the string; (iii) determining an order-(i+1) PPM model for the string; (iv) using the objective function to determine whether the order-(i+1) PPM model is more desirable than the order-i PPM model; and (v) if the order-(i+1) PPM model is less desirable than the order-i PPM model, selecting the order-i PPM model as the approximately optimal PPM model for the string, otherwise, increasing the value of i by one, and repeating steps (iv)–(v); and (c) using the approximately optimal PPM model to compress the string. The invention may further be characterized by: (d) providing additional strings to be compressed; and (e) using the approximately optimal PPM model to compress the additional strings; and/or (d) storing the selected, approximately optimal PPM model as a persistent model; and/or (e) providing additional strings to be compressed; and (f) using the stored persistent to compress the additional strings. Providing an objective function that measures the desirability of proposed PPM models may involve providing an objective function that considers at least one, two or more of: (1) the entropy of proposed PPM models; (2) the number of states of proposed PPM models; and/or (3) the compressed string length for proposed PPM models. And determining an order-i PPM model may involve performing a constrained search of prospective order-i PPM models and selecting the prospective order-i PPM model that minimizes (or maximizes) the objective function; and determining an order-(i+1) PPM model involves performing a constrained search of prospective order-(i+1) PPM models and selecting the prospective order-(i+1) PPM model that minimizes (or maximizes) the objective function.

Again, generally speaking, and without intending to be limiting, another form of the invention may comprise methods, systems, articles-of-manufacture, or coded data signals characterized by: (a) a compressor adapted to utilize a persistent PPM model to compress strings to produce compressed strings; (b) a decompressor adapted to utilize the persistent PPM model to decompress compressed strings; (c) a model optimizer, invoked occasionally (i.e., substantially less frequently than once every compression/decompression cycle), to update the persistent PPM by: (i) utilizing a current string-to-be compressed to select an approximately optimal PPM model for the current string-to-be-compressed; and (ii) replacing the persistent PPM model with the selected, approximately optimal PPM model for the current string-to-be-compressed. On average, the model optimizer may be invoked less than once for every ten strings that the compressor compresses, less than once for every hundred strings that the compressor compresses, or less than once every thousand strings that the compressor compresses. The model optimizer may also be invoked on a periodic basis, or selectively invoked at time(s) when its operation is not likely to create customer-perceptible disruptions in service quality. This form of the invention may further be characterized by: (d) a performance monitor adapted to track the compression ratio for strings compressed using the persistent PPM model, wherein the model optimizer is invoked in respond to changes in the tracked compression ratio for strings compressed using the persistent PPM model. The model optimizer may include an objective function computation module that evaluates the desirability of candidate PPM models by considering at least one, two, or more of: (1) the entropy of candidate PPM models; (2) the number of states of candidate PPM models; and/or (3) the compressed string length for candidate PPM models. The model optimizer may also includes a candidate model generator module that produces approximately optimal candidate PPM models using a constrained exponential search process. Such model generator may, starting with order-1, produce successively higher-order candidate PPM models.

Again, generally speaking, and without intending to be limiting, another form of the invention may comprise methods, systems, articles-of-manufacture, or coded data signals characterized by software that, when executed, causes a computer to: compress strings using a persistent PPM model; monitor compression performance of the persistent PPM model; and occasionally update the persistent PPM model by substituting a new, approximately optimal PPM-model computed using recently-acquired contextual information. This form of the invention may be further characterized by the presence of computer-executable code that corresponds, in material part, to the code disclosed in FIGS. 1A–H, 2A–J, 3A–S, 4A–B, 5A–F, 6A–D, 7A–B, 8A–B, 9A–L, and/or 10A–D.

Further forms of the invention relate to improved PPM-based methods, systems, articles-of-manufacture, or coded data signals that comprise alternative combinations of the features, aspects and limitations of the illustrative embodiment described below, and exemplified in the accompanying figures.

DESCRIPTION OF THE FIGURES

The accompanying figures, which are intended to be exemplary rather than limiting, depict an illustrative embodiment of the invention, as follows:

FIGS. 1A–H depict source code for a PPM model optimizer used in connection with an illustrative embodiment of the invention;

FIGS. 2A–J depict source code for a Model class, and associated methods, used in connection with an illustrative embodiment of the invention;

FIGS. 3A–S depict source code for a ModelNode class, and associated methods, used in connection with an illustrative embodiment of the invention;

FIGS. 4A–B depict source code for a ModelWalker class, and associated methods, used in connection with an illustrative embodiment of the invention;

FIGS. 5A–F depict source code for a PersistentModel class, and associated methods, used in connection with an illustrative embodiment of the invention;

FIGS. 6A–D depict source code for a TraceCountNode class, and associated methods, used in connection with an illustrative embodiment of the invention;

FIGS. 7A–B depict source code for a TraceCounts class, and associated methods, used in connection with an illustrative embodiment of the invention;

FIGS. 8A–B depict source code for a TraceCountWalker class, and associated methods, used in connection with an illustrative embodiment of the invention;

FIGS. 9A–L depict source code for a CompressedStringResource class used in connection with an illustrative embodiment of the invention;

FIGS. 10A–D depict source code for CompressedStringResource methods used in connection with an illustrative embodiment of the invention; and, FIG. 11 depicts an illustrative embodiment of the invention.

DESCRIPTION OF AN ILLUSTRATIVE EMBODIMENT OF THE INVENTION

Figure 11:
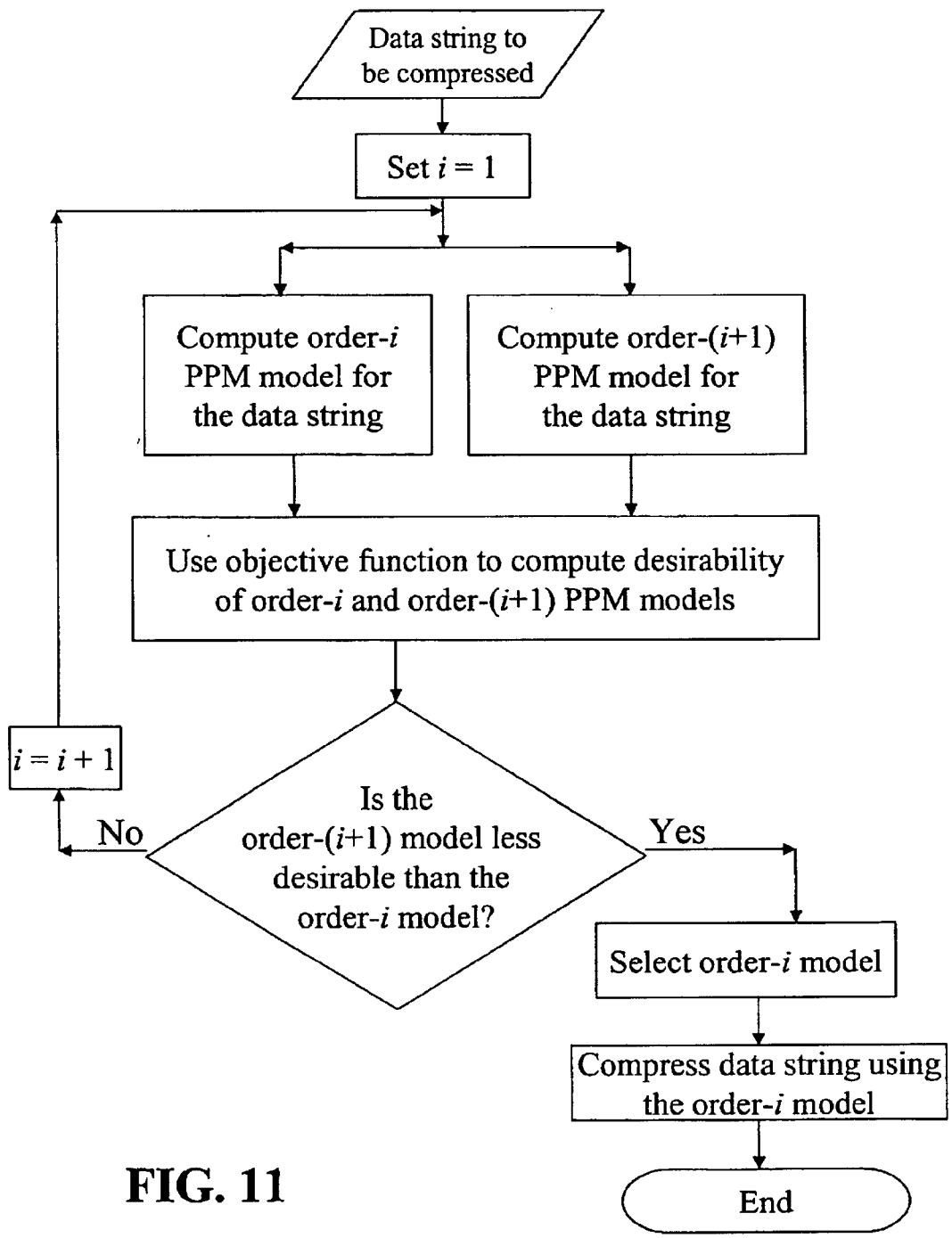

The illustrative embodiment, the source code of which is disclosed in FIGS. 1–10, seeks to find the (approximately) best prediction-by-partial-match model of a string. A model is comprised of a set of contexts and each context's corresponding probabilities for the subsequent symbol. Specifically, given a symbol sequence s=<s_1 s_2 ... s_n> of 8_bit ASCII characters and a maximum context length k, we determine the exclusion-blending order-k PPM model M* which approximately minimizes $$f(M, s) = b(M) + e(M) * |s|$$

where b(M) is the number of bits required to represent M, e(M) is the entropy of M (in bits/symbol), and |s|=n is the length of s. Note e(M)*|s| is the entropy-theoretic lower bound on the coded size of s using M, which bound we can in fact achieve via arithmetic coding but never beat on average (Shannon's noiseless source channel theorem). Also note that e(M) is just a weighted average of the entropies in each context, with weights equal to the context occurrence probabilities.

An exclusion-blending order-k model predicts the next symbol based on the previous k symbols a=<a_1 a_2 ... a_k> by choosing the longest context present in the model that is a suffix of a (hence "prediction by partial match"). That is, if the matching order-k context c was included in the chosen model, then that context's probabilities are used, ignoring all lower-order sub-contexts of c (all of which also suffix-match a); otherwise, a matching order-(k–1) context is used, etc. (There is always a match at order zero.) The "blending" of all matching contexts' probabilities in a PPM model thus amounts to giving weight 1 to the highest-order matching context and 0 to all others; thus the name "exclusion-blending order-k model."

The exclusion technique entails that the addition of a context c to a model M (giving a new model M') changes, for each symbol x predicted by c, the symbol probability of x in the highest-order sub-context of c that has non-zero prediction probability for x. This change in probabilities in turn implies that the contribution of the sub-contexts to the model entropy changes as well. Thus, regrettably, e( ) fails in general to have the property $$e(M') = p\_c * e(c) + (1\_p\_c) * e(M)$$

where p_c is the probability of the context occurring in s. It would certainly simplify the optimization if this property held.

The number of distinct contexts used in M is unconstrained—if f(M', s) is less than f(M, s), then we choose M' over M, even if it uses more contexts. The set of all distinct contexts up to order k over a q-ary alphabet has size $$1 + q + q^2 + \ldots + q^k = (q^{(k+1)}\_1)/(q\_1) \qquad (1.1)$$

The set of all possible order-k PPM models is the powerset of this set, so that the model space we mean to search is super-exponential in q and k. Obviously, we are going to add some serious assumptions to constrain the search. In particular:

(1) If a context is never encountered in s, it is not considered for inclusion in the model. This is necessary (because there is no way to estimate probabilities for such contexts), highly expedient(because it rules out the vast majority of higher-order contexts), and harmless (by assumption, we are only using our model on the same string s against which it is fit, so ignoring contexts which never occur in s can never increase model entropy).

(2) Consider the two models M*_(i–1) and M*_i which minimize f(M, s) over all models having (i–1) and i contexts, respectively. We can write the difference d(i)=[f(M*_(i–1), s)–f(M*_i, s)] as $$|s|[e(M*\_(i-1)) - e(M*\_i)] - [b(M*\_i) - b(M*\_(i-1))] = d\_{code}(i) - d\_{state}(i)$$

which illustrates the trade-off between the relative sizes of the two models, d_state(i), and the relative lengths of their codings of s, d_code(i). If d(i) is positive, then it is better to use the best i-context model than to use the best (i_1)—context model.

Generally, we would expect d_code(i) to decrease monotonically in i, approaching zero as e(M*_i) nears the best possible order-k PPM entropy, while d_state(i) should increase monotonically in i. If this were true, it would imply that d(i) can cross zero at most once. Practically speaking, d(i) will cross zero exactly once, so that for some unique i*

$$d(i) > 0 \text{ when } i <= i^*,$$

$$d(i) < 0 \text{ when } i > i^*$$

If d(i) had this property, then we could minimize f(M, s) exactly by sequentially determining the best model with 1, 2, 3, ..., i, ..., contexts, then stopping when we discovered i*. (Recall that i is bounded above by equation 1.1.) In fact, we just assume d(i) behaves this way and conduct such a search, stopping the first time d(i)<0. (Note that this is still an exponential amount of work, since we study an exponential number of candidate contexts each time we determine $M^*\_i$. However, if $|s|$ is relatively small, we're likely to find $d(i)<0$ for a small value of i, which is at least an improvement over the unconstrained search.}

(3) We make the rather strong assumption that the set of i contexts which comprise $M^*\_i$ contains as a subset the set of (i−1) contexts which comprise $M^*\_(i−1)$. This imposes a simple hierarchical structure on the models examined for each i as we let i grow from 1, which makes the optimization vastly more manageable (though still exponential in k).

What is claimed is:

1. A method of compressing data comprising:
   (a) providing a string to be compressed;
   (b) selecting an approximately optimal PPM model for the string by:
      (i) providing an objective function that measures the desirability of proposed PPM models;
      (ii) starting with i=1, determining an order-i PPM model for the string;
      (iii) determining an order-(i+1) PPM model for the string;
      (iv) using the objective function to determine whether the order-(i+1) PPM model is more desirable than the order-i PPM model; and,
      (v) if the order-(i+1) PPM model is less desirable than the order-i PPM model, selecting the order-i PPM model as the approximately optimal PPM model for the string; otherwise, increasing the value of i by one, and repeating steps (iv)–(v);
   (c) using the approximately optimal PPM model to compress the string.

2. A method of compressing data, as defined in claim 1, further comprising:
   (d) providing additional strings to be compressed; and,
   (e) using the approximately optimal PPM model to compress the additional strings.

3. A method of compressing data, as defined in claim 1, further comprising:
   (d) storing the selected, approximately optimal PPM model as a persistent model.

4. A method of compressing data, as defined in claim 3, further comprising:
   (e) providing additional strings to be compressed; and,
   (f) using the stored persistent to compress the additional strings.

5. A method of compressing data, as defined in claim 1, wherein:
   providing an objective function that measures the desirability of proposed PPM models involves providing an objective function that considers at least two of:
      (1) the entropy of proposed PPM models;
      (2) the number of states of proposed PPM models; and,
      (3) the compressed string length for proposed PPM models.

6. A method of compressing data, as defined in claim 1, wherein:
   providing an objective function that measures the desirability of proposed PPM models involves providing an objective function that considers at least:
      (1) the entropy of proposed PPM models;
      (2) the number of states of proposed PPM models; and,
      (3) the compressed string length for proposed PPM models.

7. A method of compressing data, as defined in claim 1, wherein:
   determining an order-i PPM model involves performing a constrained search of prospective order-i PPM models and selecting the prospective order-i PPM model that minimizes the objective function; and,
   determining an order-(i+1) PPM model involves performing a constrained search of prospective order-(i+1) PPM models and selecting the prospective order-(i+1) PPM model that minimizes the objective function.

8. A PPM-based data compression system comprising:
   (a) compression means for utilizing a persistent PPM model to compress strings to produce compressed strings;
   (b) decompression means for utilizing the persistent PPM model to decompress compressed strings;
   (c) optimization means, invoked occasionally, for updating the persistent PPM by:
      (i) utilizing a current string-to-be compressed to select an approximately optimal PPM model for the current string-to-be-compressed; and,
      (ii) replacing the persistent PPM model with the selected, approximately optimal PPM model for the current string-to-be-compressed.

9. A PPM-based data compression system, as defined in claim 8, wherein:
   the optimization means is, on average, invoked less than once for every ten strings that the compression means compresses.

10. A PPM-based data compression system, as defined in claim 8, wherein:
   the optimization means is, on average, invoked less than once for every hundred strings that the compression means compresses.

11. A PPM-based data compression system, as defined in claim 8, wherein:
   the optimization means is invoked on a periodic basis.

12. A PPM-based data compression system, as defined in claim 8, wherein:
   the optimization means is selectively invoked at time(s) when its operation is not likely to create customer-perceptible disruptions in service quality.

13. A PPM-based data compression system, as defined in claim 8, further comprising:
   (d) an performance monitor adapted to track the compression ratio for strings compressed using the persistent PPM model; and,
   wherein the model optimizer is invoked in respond to changes in the tracked compression ratio for strings compressed using the persistent PPM model.

14. A PPM-based data compression system, as defined in claim 8, wherein the model optimizer includes:
   a objective function computation module that evaluates the desirability of candidate PPM models by considering at least two of:
      (1) the entropy of candidate PPM models;
      (2) the number of states of candidate PPM models; and,
      (3) the compressed string length for candidate PPM models.

15. A PPM-based data compression system, as defined in claim 8, wherein the optimization means includes:
   a objective function computation module that evaluates the desirability of candidate PPM models by considering at least:
      (1) the entropy of candidate PPM models;
      (2) the number of states of candidate PPM models; and,
      (3) the compressed string length for candidate PPM models.

16. A PPM-based data compression system, as defined in claim 14, wherein the optimization means further includes:
a candidate model generator module that produces approximately optimal candidate PPM models using a constrained exponential search process.

17. A PPM-based compression system, as defined in claim 16, wherein the candidate model generator successively produces higher-order candidate PPM models.

18. An article-of-manufacture comprising a computer-readable medium, for use in connection with a computer, the computer-readable medium including software that, when executed causes the computer to:

compress strings using a persistent PPM model;

monitor compression performance of the persistent PPM model; and, occasionally update the persistent PPM model by substituting a new, approximately optimal PPM-model computed using recently-acquired contextual information.

19. An article-of-manufacture, as defined in claim 18, further comprising computer-executable code corresponding to FIGS. 1–8.

* * * * *